(12) United States Patent
Ito et al.

(10) Patent No.: US 6,928,865 B2
(45) Date of Patent: Aug. 16, 2005

(54) THERMAL FLOWMETER HAVING A LAMINATE STRUCTURE

(75) Inventors: Akihiro Ito, Komaki (JP); Naotsugu Seko, Komaki (JP)

(73) Assignee: CKD Corporation, Komaki (JP)

( * ) Notice: Subject to any disclaimer, the term of this patent is extended or adjusted under 35 U.S.C. 154(b) by 0 days.

(21) Appl. No.: 10/983,026

(22) Filed: Nov. 8, 2004

(65) Prior Publication Data

US 2005/0081620 A1    Apr. 21, 2005

Related U.S. Application Data

(63) Continuation of application No. PCT/JP03/06555, filed on May 26, 2003.

(30) Foreign Application Priority Data

May 29, 2002  (JP) ............................. 2002-155021

(51) Int. Cl.[7] .............................................. G01F 1/68
(52) U.S. Cl. ................................. 73/204.21; 73/202.5
(58) Field of Search ........................ 73/204.21, 204.22, 73/204.26, 202, 202.5

(56) References Cited

FOREIGN PATENT DOCUMENTS

| JP | A 2000-146652 | 5/2000 |
|---|---|---|
| JP | A 2001-165734 | 6/2001 |
| JP | A 2002-5717 | 1/2002 |
| JP | A 2002-168669 | 6/2002 |
| JP | A 2003-194607 | 7/2003 |
| JP | A 2003-194608 | 7/2003 |

*Primary Examiner*—Harshad Patel
(74) *Attorney, Agent, or Firm*—Oliff & Berridge, PLC

(57) ABSTRACT

The present invention relates to a thermal flowmeter capable of sensing a flow rate in either direction, having a linear output characteristic, and producing a stable output without impairing the response characteristic. In the thermal flowmeter, a laminate is fitted in a channel space formed in a body, forming a main channel. The laminate includes a mesh sheet so that a mesh portion is provided between the main channel and a sensor channel. A measurement chip is provided with an upstream temperature sensing resistor, a downstream temperature sensing resistor, a heating resistor, and a fluid temperature sensing resistor. By an electric circuit, the heating resistor and the fluid temperature sensing resistor are controlled to provide a constant temperature difference. Accordingly, the flow rate of a fluid under measurement is measured based on a temperature difference between the upstream and downstream temperature sensing resistors.

10 Claims, 28 Drawing Sheets

CONSTANT TEMPERATURE DIFFERENCE CIRCUIT

OUTPUT CIRCUIT

THERMAL FLOWMETER HAVING A LAMINATE STRUCTURE

This is a Continuation of Application No. PCT/JP03/06555 filed May 26, 2003. The entire disclosure of the prior application is hereby incorporated by reference herein in its entirety.

BACKGROUND OF THE INVENTION

1. Field of the Invention

The present invention relates to a thermal flowmeter for measuring a flow rate with use of resistors (hot wires). More particularly, the present invention is concerned with a thermal flowmeter which can measure the flow rate of a fluid under measurement in either direction with a high accuracy.

2. Description of Related Art

Heretofore, vacuum suction has been used for handling a semiconductor chip at the time of mounting the chip, and a sucked state of the chip by vacuum suction has been confirmed using a pressure sensor. Recently, however, semiconductor chips have been becoming more and more small in size. Therefore, for example in the case of a 0.5 mm square chip, there is used a suction orifice (nozzle) having a diameter of 0.5 mm or 0.3 mm. Consequently, as shown in FIG. 30, there occurs little difference in the internal pressure of the orifice between the time when suction is performed and the time when suction is not performed. Thus, with the pressure sensor, it has become impossible to confirm a sucked state of a semiconductor chip. Under the circumstances, it has been proposed to confirm a sucked state of a semiconductor chip by detecting a flow rate of air flowing through the orifice. FIG. 30 shows an output example of a pressure sensor under the conditions of a nozzle diameter being 0.3 mm and a vacuum pressure being −70 kPa.

In view of the above-mentioned point the applicant in the present case has proposed in Japanese Patent Application No. 2000-368801 a thermal flowmeter suitable for the confirmation of suction. FIG. 31 shows the results of having made confirmation of suction under the above conditions. As is apparent from FIG. 31, it is seen that the confirmation of suction which has so far been difficult with use of a pressure sensor can be done by using the thermal flowmeter proposed in the above patent application.

However, with the thermal flowmeter which the applicant in the present case proposed in Japanese Patent Application No. 2000-368801, as shown in FIG. 32, the pressure characteristic is deteriorated as the degree of vacuum increases, and there has been a possibility that the confirmation of suction may not be done with a high accuracy. Moreover, the output characteristic of the thermal flowmeter in question is as shown in FIG. 33 in which a flowing direction cannot be detected because the same value is outputted irrespective of in which direction a fluid under measurement flows. Thus, when the flow rate in either direction cannot be detected, it is impossible to confirm release from suction although it is possible to confirm suction. This is because the fluid flowing direction when a semiconductor chip is chucked and that when the semiconductor chip is released are opposite to each other. FIGS. 32 and 33 illustrate outputs, assuming that a full-scale flow rate is 1 L/min in both cases.

For confirming suction and release by use of a flowmeter, it is necessary to use a flowmeter able to detect a flow rate in either direction. For example, such a flowmeter is disclosed in Japanese Unexamined Patent Publication No. 2002-5717. However, this flowmeter involves the problem that its output characteristic is not linear, as shown in FIG. 34. In the case of such a non-linear output characteristic, it has so far been impossible to control clogging of a nozzle. A linear output characteristic can be obtained by using an arithmetic circuit, as described for example in Japanese Unexamined Patent Publication No. 2001-165734. However, such an arithmetic circuit must be provided separately, which is disadvantageous in point of cost.

Further, the flowmeter described in Japanese Unexamined Patent Publication No. 2002-5717 involves the problem that the output becomes unstable due to the influence of a turbulent flow, as shown in FIG. 35. Once the output becomes unstable, it is required that a threshold value in the confirmation of suction be set rather low. In confirming suction, however, a very small change in flow rate is detected, so if the threshold value is set low, it is determined that suction is performed in normal condition even when suction is not in normal condition and the flow rate is smaller than that in normal suction. That is, it has been impossible to make the confirmation of suction with a high accuracy. Likewise, in case of using a collet type nozzle which chucks a semiconductor chip while ensuring a constant leakage quantity at all times, it has been impossible to make the confirmation of suction. Such fluctuations in output can be eliminated by using an electric filter, but the use of an electric filter is not desirable because the response characteristic is impaired.

SUMMARY OF THE INVENTION

The present invention has been accomplished for solving the above-mentioned problems and it is an object of the invention to provide a thermal flowmeter capable of sensing a flow rate in either direction, having a linear output characteristic, and producing a stable output without impairing the response characteristic.

According to the present invention, for solving the above-mentioned problems, A thermal flowmeter having not only a sensor channel over which resistors for measuring a flow rate are mounted bridgewise but also a bypass channel relative to the sensor channel, the thermal flowmeter comprising: a body having a shape which is symmetric right and left; a laminate having a shape which is symmetric, the laminate being fitted in the body to divide a fluid into a fluid portion flowing into the sensor channel and a fluid portion flowing into the bypass channel; an upstream temperature sensing resistor disposed in the sensor channel on an upstream side in a fluid flowing direction; a downstream temperature sensing resistor disposed in the sensor channel on a downstream side in the fluid flowing direction; a heating resistor disposed between the upstream temperature sensing resistor and the downstream temperature sensing resistor to heat the upstream temperature sensing resistor and the downstream temperature sensing resistor; a fluid temperature sensing resistor for sensing the temperature of a fluid under measurement; and an electric circuit which makes a control so that the heating resistor and the fluid temperature sensing resistor show a constant difference in temperature and which measures the flow rate of the fluid under measurement based on a temperature difference between the upstream temperature sensing resistor and the downstream temperature sensing resistor.

According to another aspect, the present invention provides a thermal flowmeter having not only a sensor channel over which resistors for measuring a flow rate are mounted bridgewise but also a bypass channel relative to the sensor channel, characterized in that the bypass channel is formed by bringing a substrate with electrodes formed on a surface thereof for connection to an electric circuit to carry out a measurement principle using resistors into close contact with a body formed with a fluid channel having a side-face opening so as to close the side-face opening through a laminate formed by laminating plural thin sheets having been subjected to etching, the sensor channel is defined by a groove formed in at least one of a measurement chip and the substrate when electrodes for resistors and the electrodes for the electric circuit are bonded together to mount the measurement chip onto the substrate, the measurement chip having the resistors and the electrodes for resistors which electrodes are connected to the resistors, the resistors of the measurement chip comprising an upstream temperature sensing resistor disposed on an upstream side in a fluid flowing direction, a downstream temperature sensing resistor disposed on a downstream side in the fluid flowing direction, a heating resistor disposed between the upstream temperature sensing resistor and the downstream temperature sensing resistor to heat both resistors, and a fluid temperature sensing resistor for sensing the temperature of a fluid under measurement, the electric circuit making a control so that the heating resistor and the fluid temperature detecting resistor show a constant difference in temperature, and the flow rate of the fluid under measurement is measured based on a temperature difference between the upstream temperature sensing resistor and the downstream temperature sensing resistor. By the term "side-face opening" as referred to herein is meant an opening formed in a side face (a face to which inlet and outlet ports are not open) of the body to which the substrate is mounted.

In this thermal flowmeter, the fluid under measurement flowing into the flowmeter is divided into a fluid portion flowing into the sensor channel with resistors mounted thereon bridgewise and a fluid portion flowing into the bypass channel relative to the sensor channel. Then, based on the measurement principle using the resistors, the flow rate of the fluid under measurement flowing through the sensor channel and in its turn the flow rate of the fluid under measurement flowing through the interior of the thermal flowmeter are measured.

More specifically, a control is made by the electric circuit so that a constant temperature difference arises between the heating resistor and the fluid temperature sensing resistor, and the flow rate of the fluid under measurement is measured based on a temperature difference between the upstream temperature detecting resistor and the downstream temperature detecting resistor. Therefore, the output increases in the case of a forward flow and decreases in the case of a reverse flow. Thus, it is possible to detect the flowing direction of the fluid under measurement.

As to the bypass channel, a substrate with electrodes formed on a surface thereof for connection to an electric circuit to carry out a measurement principle using resistors is brought into close contact with a body formed with a fluid channel having a side-face opening so as to close the side-face opening through a laminate formed by laminating plural thin sheets having been subjected to etching. Therefore, a sectional area of the bypass channel can be changed by modifying the construction (combination of the thin sheets) of the laminate. A change in sectional area of the bypass channel causes a change in the ratio (bypass ratio) of the fluid portions divided from the fluid under measurement into the sensor channel and the bypass channel. Thus, an optimum measurement range can be set by modifying the construction of the laminate. Consequently, a linear output characteristic can be obtained even without providing an arithmetic circuit separately.

The bypass ratio can be changed by using a laminate formed by laminating mesh plates through grooved both-end open sheets, the grooved both-end opening sheets each having openings at both ends thereof and central grooves.

Further, both-end opening sheets each having openings at both ends thereof may be included in the laminate. With these laminates, it is possible to diminish the sectional area of the bypass channel and hence possible to change the bypass ratio.

In the thermal flowmeter of the present invention it is preferable that mesh sheets each having mesh portions at both ends thereof be included in the laminate. Moreover, in the thermal flowmeter of the present invention it is preferable that the laminate is formed by laminating mesh sheets through spacers, the spacers each being formed by a thin sheet and having an edge portion of the thin sheet and an opening formed in the other portion of the thin sheet.

This is because the fluid under measurement can be allowed to flow as a highly regulated flow into the sensor channel by incorporating mesh sheets in the laminate, seeing that the disturbance of flow of the fluid is diminished by passing through mesh portions. Thus, it is preferable that plural mesh sheets be incorporated in the laminate. In this case, laminating the mesh sheets through predetermined spacings is preferable to laminating them directly. This is because a greater flow uniforming effect can be obtained. Thus, it is preferable that the mesh sheets be laminated through spacers.

In the thermal flowmeter of the present invention, since the flow of the fluid under measurement flowing through the sensor channel can thus be regulated, it is possible to obtain a very stable output. Besides, the response characteristic is not impaired because an electric filter is not used.

DETAILED DESCRIPTION OF THE PREFERRED EMBODIMENTS

Thermal flowmeters according to most preferred embodiments of the present invention will be described below with reference to the accompanying drawings. The thermal flowmeters embodying the invention have a high response characteristic, a high sensitivity, and a linear output characteristic, and are suitable for use in measuring a flow rate in either direction, for example, in confirming a state of suction and a state of release at the time of handling a semiconductor chip in a chip mounting step.

First Embodiment

Figure 1:
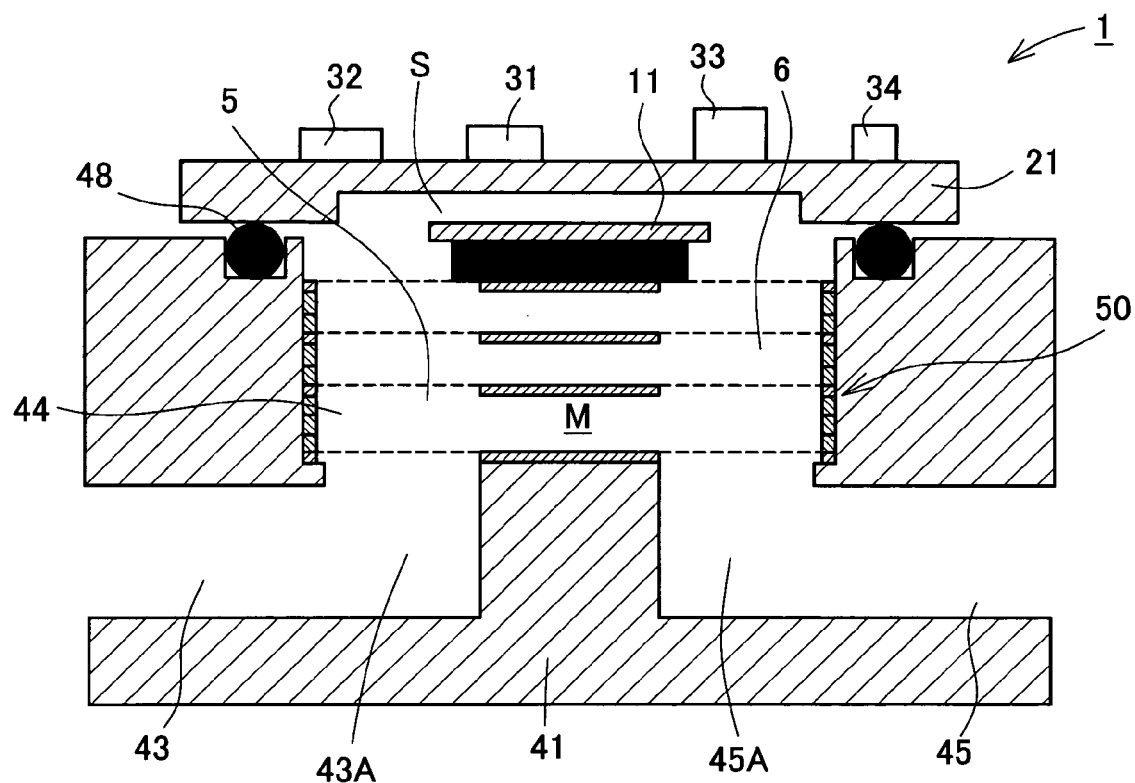
FIG. 1 is a schematic construction diagram a thermal flowmeter (full-scale flow rate: 5 L/min) according to a first embodiment of the present invention.

First, a description will be given of a first embodiment of the present invention. A schematic construction of a thermal flowmeter according to the first embodiment is shown in FIG. 1, which is a sectional view of the thermal flowmeter indicated at 1. As shown in FIG. 1, the thermal flowmeter 1 of this first embodiment includes a body 41, a sensor substrate 21, and a laminate 50. With the laminate 50 fitted in a channel space 44 formed in the body 41, the sensor substrate 21 is brought into close contact with the body 41 through a seal packing 48 with use of screws. In this way there are formed a sensor channel S and a main channel M as a bypass channel relative to the sensor channel S.

Figure 2:
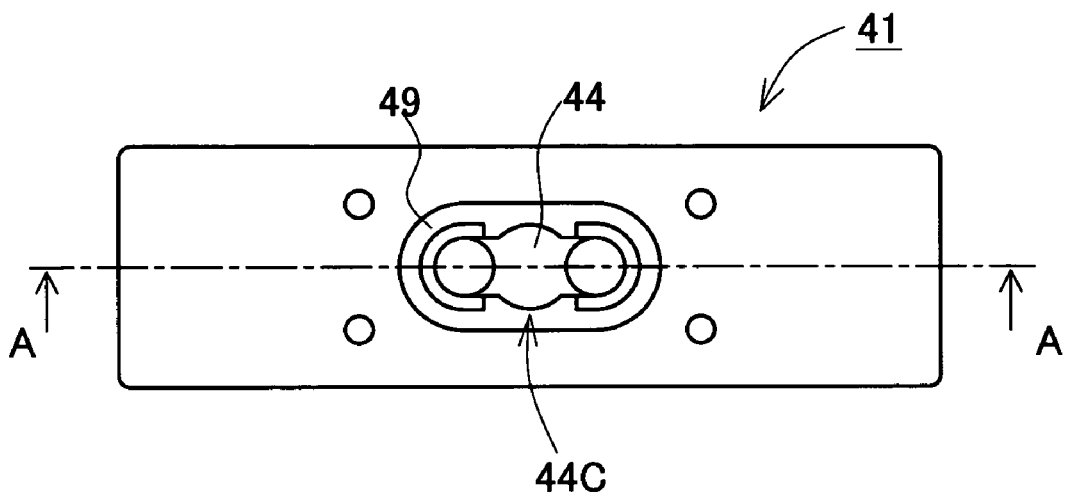
FIG. 2 is a plan view of a body.
Figure 3:
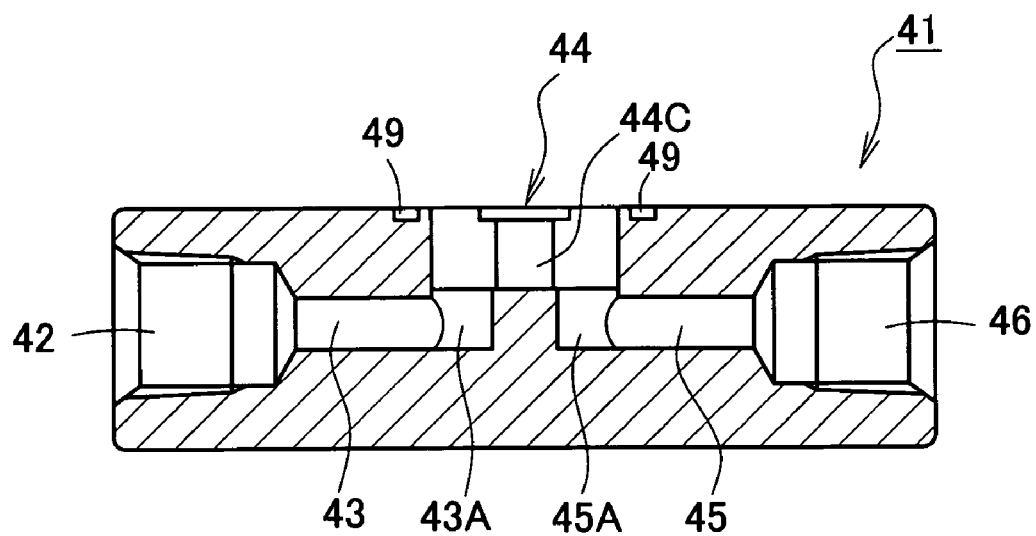
FIG. 3 is a sectional view taken on line A—A in FIG. 2.

As shown in FIGS. 2 and 3, the body 41 is in the shape of a rectangular parallelepiped and is symmetric right and left. FIG. 2 is a plan view showing the body 41 and FIG. 3 is a sectional view taken on line A—A in FIG. 2. An inlet port 42 and an outlet port 46 are formed in both end faces of the body 41. An inlet channel 43 is formed from the inlet port 42 toward the center of the body and likewise an outlet channel 45 is formed from the outlet port 46 toward the center of the body. The inlet channel 43 and the outlet channel 45 are formed below the main channel M. That is, the inlet and outlet channels 43, 45 are not aligned with the main channel M.

The channel space 44 for forming the main channel M and the sensor channel S is formed in an upper portion of the body 41. The shape of a cross section of the channel space 44 is such that both short sides of a rectangle are arcuate (semicircular), with arcuate convex portions 44C being formed centrally of the cross section. The convex portions 44C are for positioning of a laminate 50 (thin sheets). An underside of the channel space 44 is in communication with the inlet channel 43 and the outlet channel 45. More specifically, the inlet channel 43 and the outlet channel 45 are in communication with the channel space 44 through 90°-bent elbow portions 43A and 45A, respectively. Further, a groove 49 for fitting therein of a seal packing 48 is formed in an upper surface of the body 41 and along an outer periphery of the channel space 44.

Figure 4:
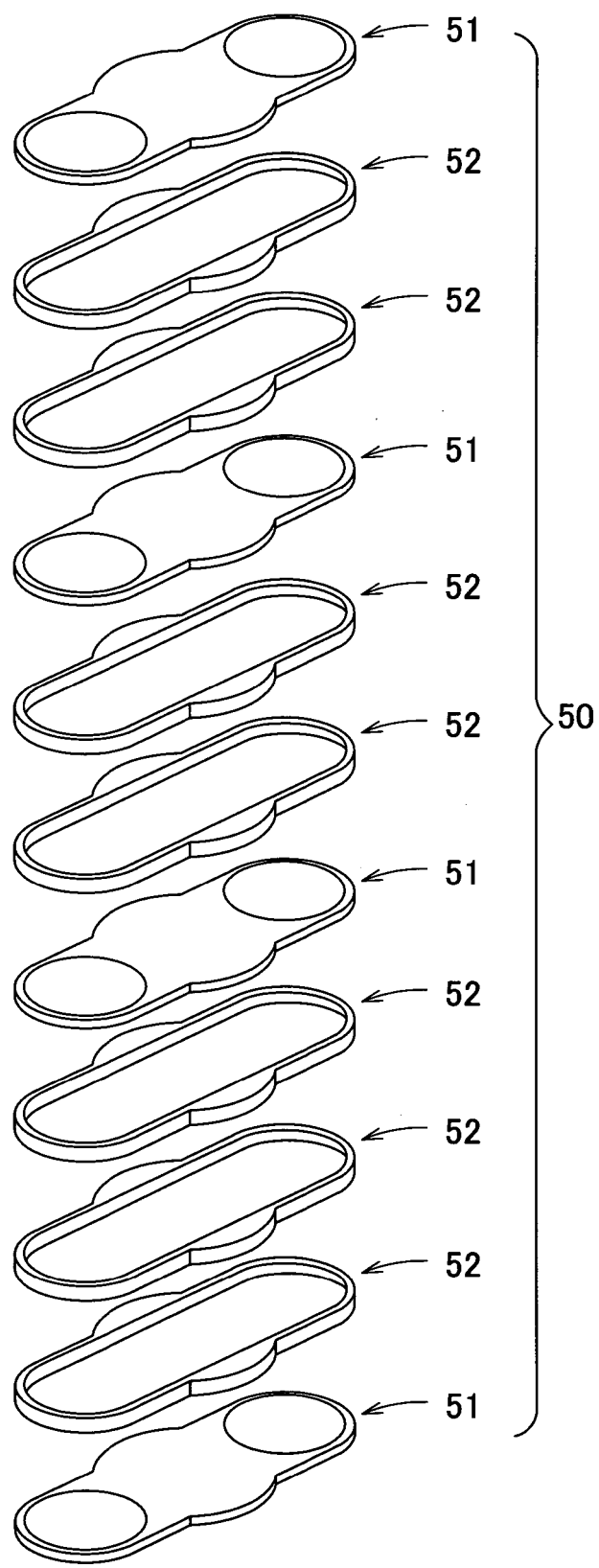
FIG. 4 is an exploded perspective view of a laminate shown in FIG. 1.

The laminate 50 is formed by laminating a total of eleven thin sheets of two types. FIG. 4 is an exploded perspective view showing the structure of the laminate 50. As shown in the same figure, the laminate 50 is formed by laminating a mesh sheet 51, three spacers 52, a mesh sheet 51, two spacers 52, a mesh sheet 51, two spacers 52, and a mesh sheet 51, successively from below. These mesh sheets 51 and spacers 52 are each 0.5 mm or less in thickness and have been micromachined to respective shapes by etching. Their projected shapes are the same as the cross-sectional shape of the channel space 44. With this arrangement, the laminate 50 is fitted in the channel space 44 closely without leaving any clearance.

By fitting the laminate 50 thus assembled into the channel space 44 there is obtained a full-scale flow rate of the thermal flowmeter 1 of 5 L/min. That is, by changing the shape (combination) of the thin sheets which constitute the laminate 50, the sectional area of the main channel M changes to change the bypass ratio of the fluid under measurement, so that it is possible to set an arbitrary flow rate range. As to an example of a different full-scale flow rate (full-scale flow rate 1 L/min), a description will be given later.

Figure 5A:
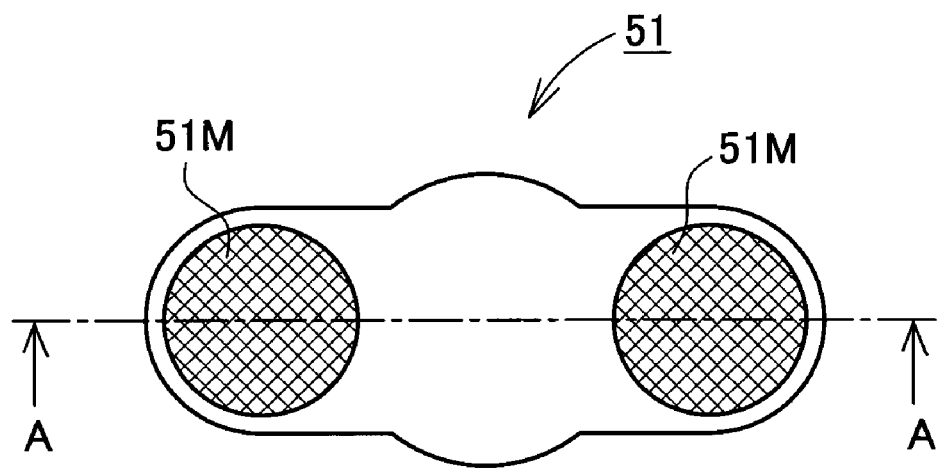
FIG. 5A is a plan view of a mesh sheet.
Figure 5B:
FIG. 5B is a sectional view taken on line A—A in FIG. 5A.
Figure 6:
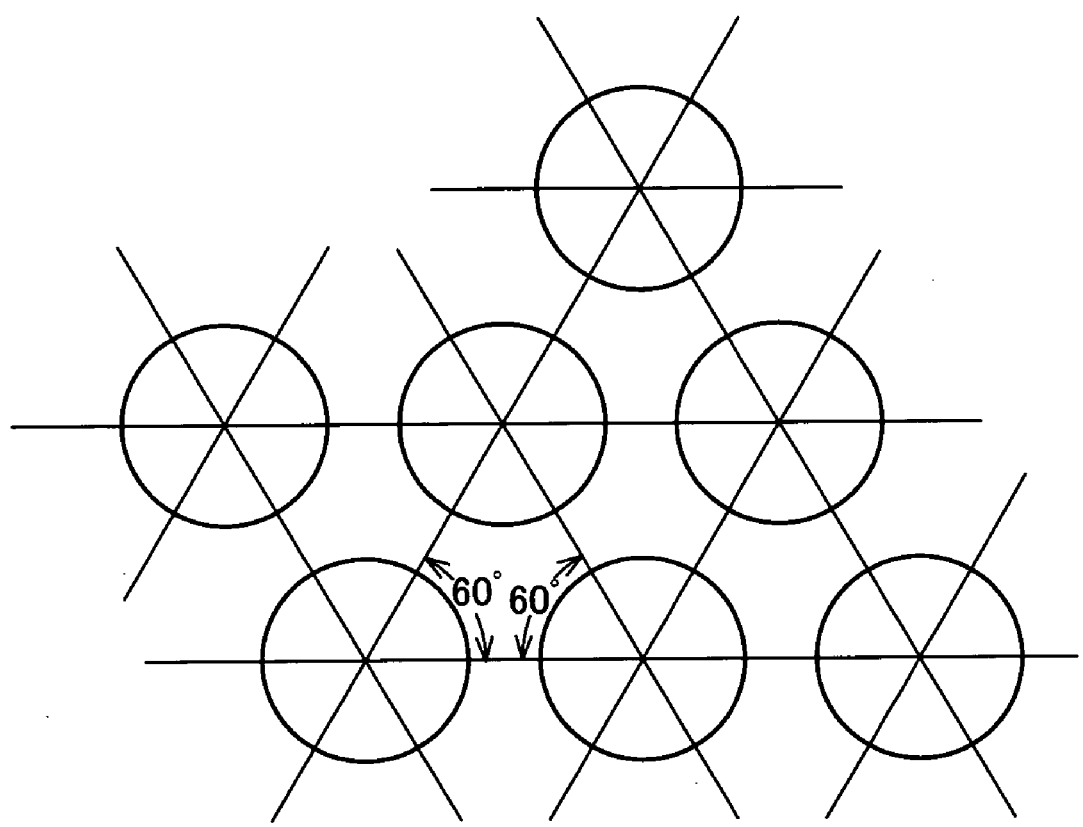
FIG. 6 is an enlarged view of a mesh portion shown in FIGS. 5A and 5B.

Individual thin sheets which constitutes the laminate 50 will now be described. First, the mesh sheet 51 will be described with reference to FIGS. 5A, 5B and 6. FIG. 5A is a plan view of the mesh sheet 51, FIG. 5B is a sectional view taken on line A—A in FIG. 5A, and FIG. 6 is an enlarged view of a mesh portion 51M of the mesh sheet 51. As shown in FIGS. 5A and 5B, the mesh sheet 51 is a thin sheet 0.3 mm in thickness with mesh portions 51M formed at both ends thereof. Each mesh portion 51M is a circular portion having a diameter of 4 mm and is formed so that a center-to-center distance of holes (0.2 mm dia.) which constitute the mesh is 0.27 mm with respect to all the holes, as shown in FIG. 6. That is, the holes are formed so that the center of each hole corresponds to the vertex of a regular triangle. The mesh portion 51M is thinner than the other portion of each thin sheet as in FIG. 5B and the thickness thereof is in the range of 0.05 to 0.1 mm.

Figure 7A:
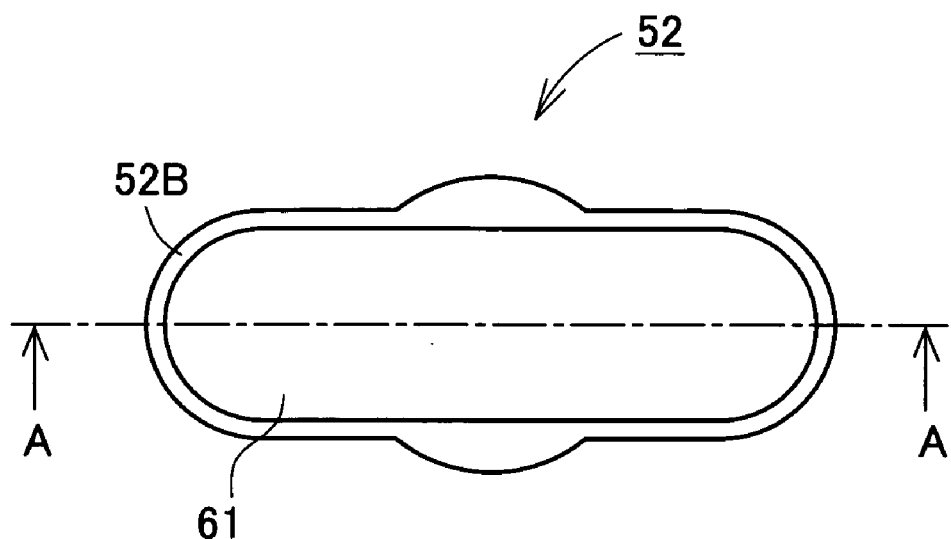
FIG. 7A is a plan view of a spacer.
Figure 7B:
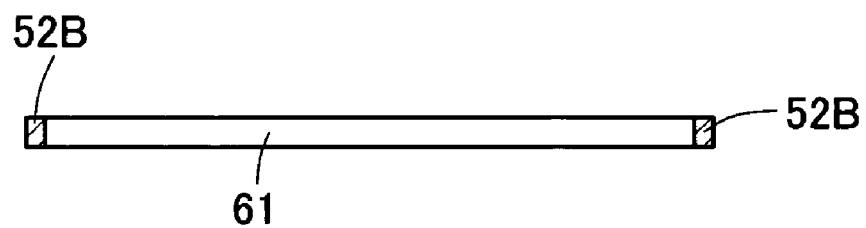
FIG. 7B is a sectional view taken on line A—A in FIG. 7A.

A description will now be given of the spacer 52 with reference to FIGS. 7A and 7B. FIG. 7A is a plan view of the spacer 52 and FIG. 7B is a sectional view taken on line A—A in FIG. 7A. As shown in FIGS. 7A and 7B, the spacer 52 has been etched so that an outer periphery portion 52B is left unetched. Thus, an opening 61 is formed in the spacer 52. The thickness of the spacer 52 is 0.5 mm.

Turning back to FIG. 1, the mesh sheets 51 and the spacers 52 are combined, then laminated and bonded as in FIG. 4 to form the laminate 50, which in turn is fitted in the channel space 44 to form the main channel M. In more particular terms, the main channel M is formed by the opening 61 of the spacer 52. Further, communication channels 5 and 6 are formed by the mesh portions 51M provided in the mesh sheet 51 and the opening 61 formed in the spacer 52. The communication channel 5 is for making the inlet channel 43 communicate with the main channel M and the sensor channel S, while the communication channel 6 is for making the outlet channel 45 communicate with the main channel M and the sensor channel S.

Three layers of mesh portions 51M are laminated between the main channel M and the sensor channel S. The spacing between vertically adjacent mesh portions 51M is set at a value equal to the thickness (1.0 mm) of two spacers 52. According to this arrangement, a flow-regulated fluid to be subjected to measurement can be allowed to flow into the sensor channel S. This is because the disturbance of flow of the fluid is diminished every time the fluid passes through the mesh portions 51M. The mesh portions 51M are disposed also in the communicating portions between the elbow portions 43A, 45A and the channel space 44 (main channel M).

Figure 8:
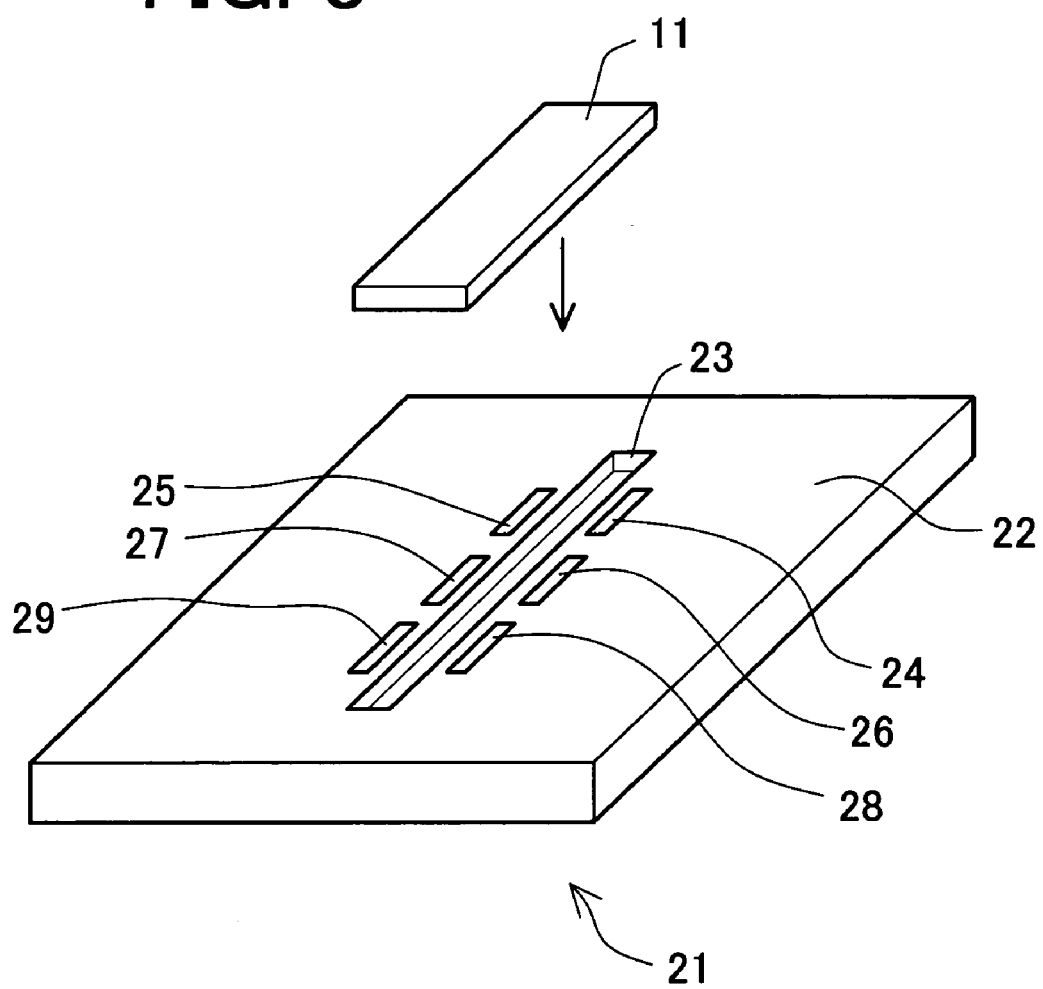
FIG. 8 is a perspective view of a sensor substrate.

On the other hand, the sensor substrate 21 outputs a measured flow rate as an electric signal. More specifically, a groove 23 is formed centrally on a surface side (mounting side for the body 41) of a printed circuit board 22 which serves as a base, as shown in FIG. 8. On both sides of the groove 23 there are provided electrodes 24, 25, 26, 27, 28, and 29 for an electric circuit. On the other hand, on a back side of the printed circuit board 22 there is provided an electric circuit composed of electric elements 31, 32, 33, and 34 (see FIG. 1). In the printed circuit board 22, the electrodes 24 to 29 for the electric circuit are connected to the electric circuit composed of electric elements 31 to 34. Further, a measurement chip 11 is mounted on the surface of the printed circuit board 22 as will be described later.

Figure 9:
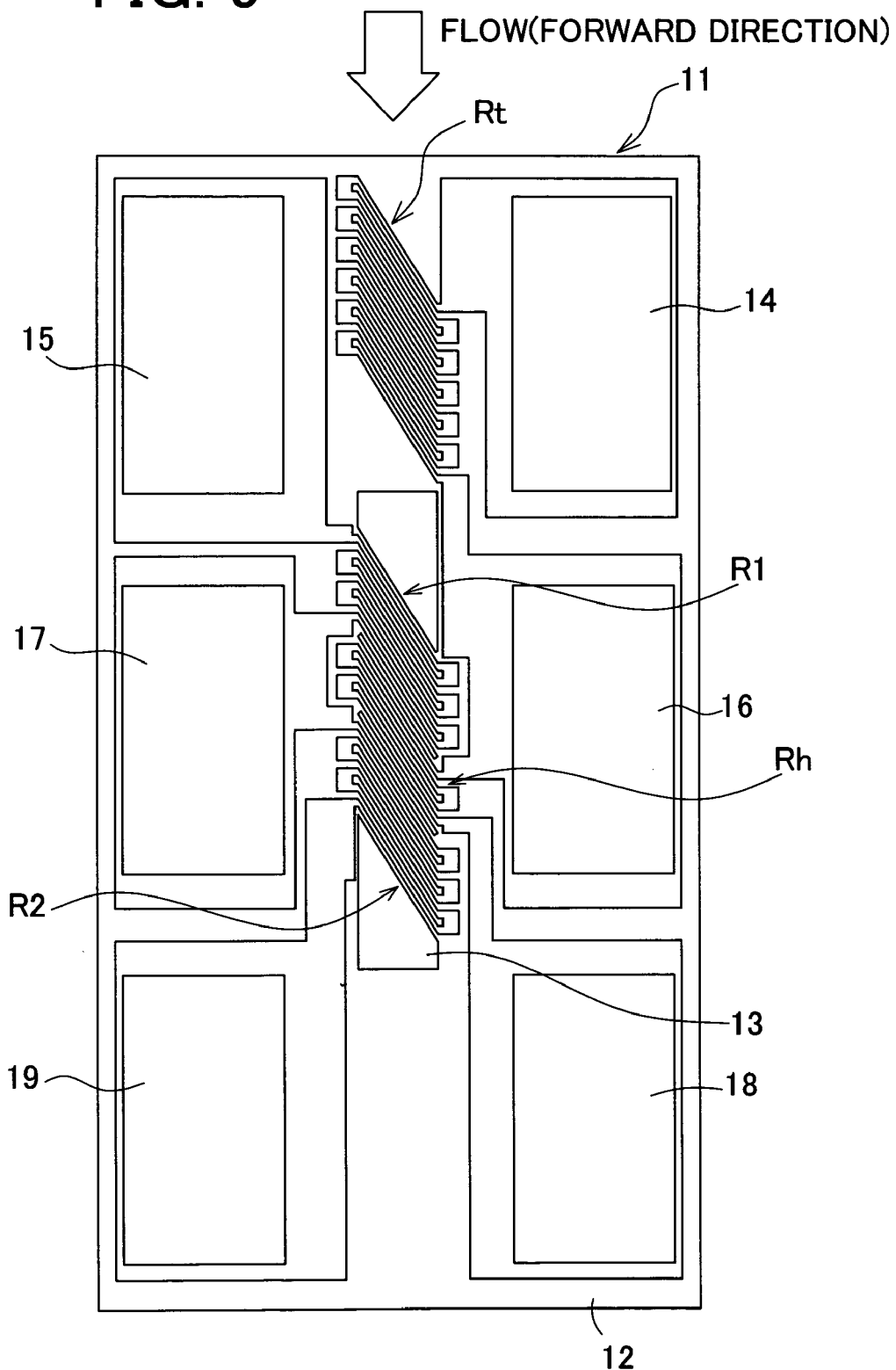
FIG. 9 is a plan view of a measurement chip

The measurement chip 11 will now be described with reference to FIG. 9. FIG. 9 is a plan view of the measurement chip 11. As shown in FIG. 9, the measurement chip 11 is obtained by subjecting a silicon chip 12 to semiconductor micromachining. According to this micromachining technique, a groove 13 is formed centrally of the chip and electrodes 14, 15, 16, 17, 18, and 19 for resistors (hot wires) are formed at both ends of the chip.

At the same time, an upstream temperature sensing resistor R1 is extended from the electrodes 15 and 17 for resistors and is mounted bridgewise over the groove 13. Likewise, a downstream temperature sensing resistor R2 is extended from the electrodes 17 and 19 for resistors and is mounted bridgewise over the groove 13. Further, a heating resistor Rh is extended between the upstream temperature sensing resistor R1 and the downstream temperature sensing resistor R2 from the electrodes 16 and 18 for resistors and is mounted bridgewise over the groove 13. In the measurement chip 11, a fluid temperature sensing resistor Rg is extended from the electrodes 14 and 16 for resistors to the upstream side in the forward direction of the sensor channel S.

The electrodes 14, 15, 16, 17, 18, and 19 for hot wires on the measurement chip 11 are bonded to the electrodes 24, 25, 26, 27, 28, and 29 (see FIG. 8), respectively, for the electric circuit on the sensor substrate 21 by solder reflow or using an electrically conductive adhesive or the like. With this bonding, the measurement chip 11 is mounted onto the sensor substrate 21. When the measurement chip 11 is mounted on the sensor substrate 21, the fluid temperature sensing resistor Rt, upstream temperature sensing resistor R1, the downstream temperature sensing resistor R2, and the heating resistor Rh, which are provided on the measurement chip 11, are connected to the electric circuit provided on a back side of the sensor substrate 21 through the electrodes 14 to 19 for resistors on the measurement chip 11 and the electrodes 24 to 29 (see FIG. 8) for the electric circuit on the sensor substrate 21. As a result, a constant temperature difference circuit shown in FIG. 10 and an output circuit shown in FIG. 11 are constituted.

Figure 10:
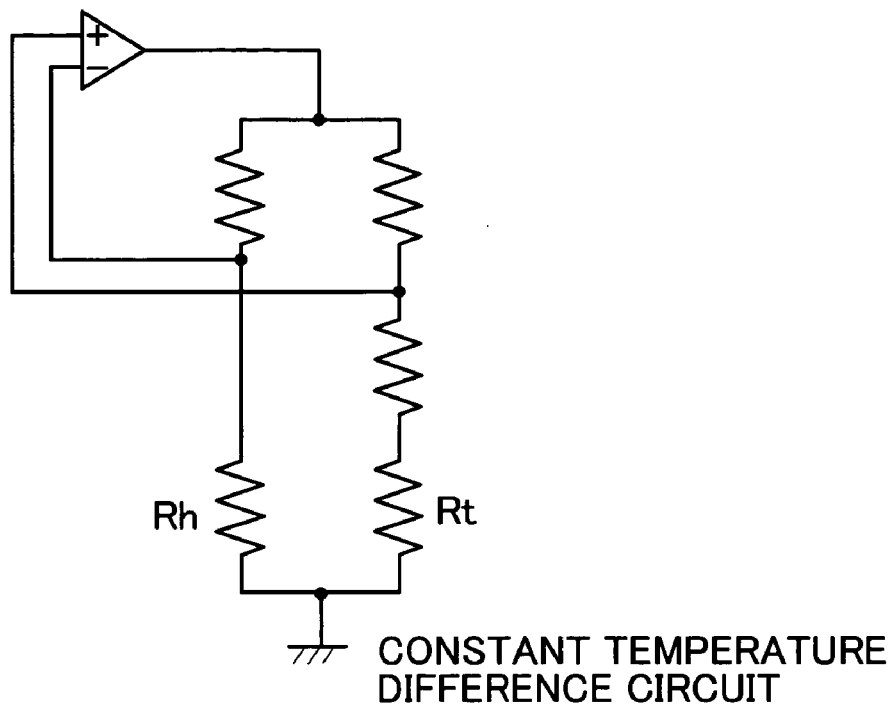
FIG. 10 is a circuit diagram of a constant temperature difference circuit.
Figure 11:
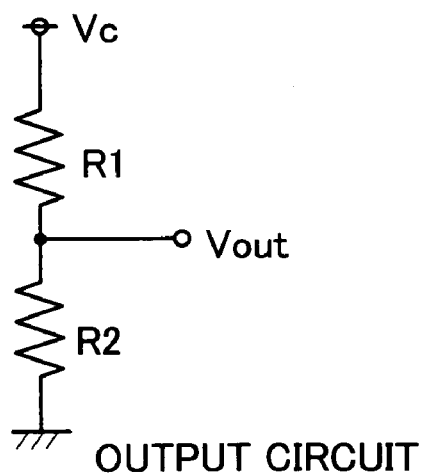
FIG. 11 is a circuit diagram of an output circuit.

The constant temperature difference circuit shown in FIG. 10 is a circuit for controlling the heating resistor Rh so as to have a constant temperature difference from the fluid temperature detected by the fluid temperature detecting resistor Rt. The output circuit shown in FIG. 10 is a circuit for outputting a voltage value corresponding to the temperature difference between the upstream and downstream temperature sensing resistors R1, R2. In this output circuit, the upstream and downstream temperature sensing resistors R1, R2 are connected in series and a constant voltage Vc is applied thereto. A midpoint potential Vout between both resistors R1 and R2 is outputted as a measurement signal.

When the measurement chip 11 is mounted on the sensor substrate 21, the groove 13 of the chip 11 becomes superimposed on the groove 23 of the sensor substrate 21.

Therefore, as shown in FIG. 1, when the sensor substrate 21 with the measurement chip 11 mounted thereon is brought into close contact with the body 41 through the laminate 50 and the seal packing 48, an elongated sensor channel S comprising the groove 13 of the measurement chip 11 and the groove 23 of the sensor substrate 21 is formed between the sensor substrate 21 and the measurement chip 11 in the channel space 44 of the body 41. In the sensor channel S, therefore, the fluid temperature sensing resistor Rt, the upstream temperature sensing resistor R1, the downstream temperature sensing resistor R2, and the heating resistor Rh, are provided bridgewise.

Figure 12:
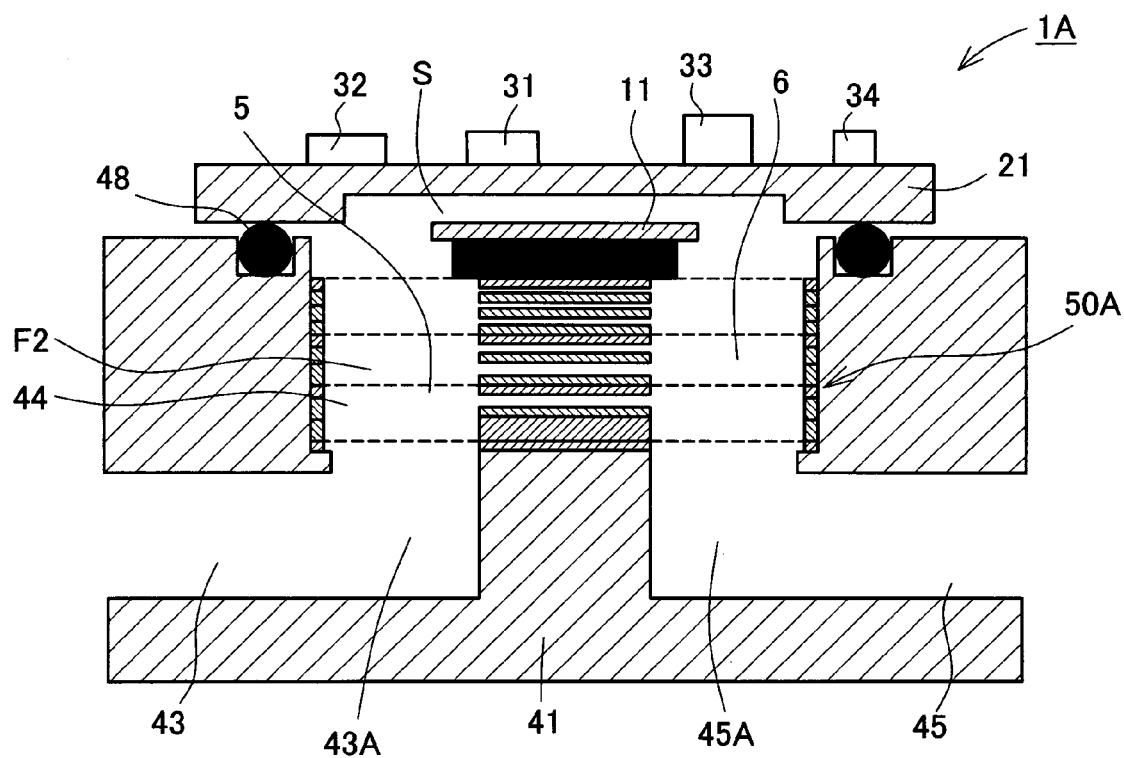
FIG. 12 is a schematic construction diagram of a thermal flowmeter (full-scale flow rate: 1 L/min) according to a modification of the first embodiment.

Subsequently, reference will now be made to the case where the full-scale flow rate is set at 1 L/min. A schematic construction of a thermal flowmeter with a full-scale flow rate of 1 L/min is shown in FIG. 12. FIG. 12 is a sectional view of the thermal flowmeter which is indicated at 1A. As shown in FIG. 12, the thermal flowmeter 1A has about the same construction as the thermal flowmeter 1, but is different in that, in place of the laminate 50, a laminate 50A is fitted in the channel space 44. That is, in the thermal flowmeter 1A, the laminate 50A, which is for diminishing the sectional area of the main channel M, is fitted in the channel space 44. Therefore, reference will be made mainly to the point different from the thermal flowmeter 1. The same constructional portions as in the thermal flowmeter 1 are identified by the same reference numerals, and explanations thereof will be omitted suitably.

Figure 13:
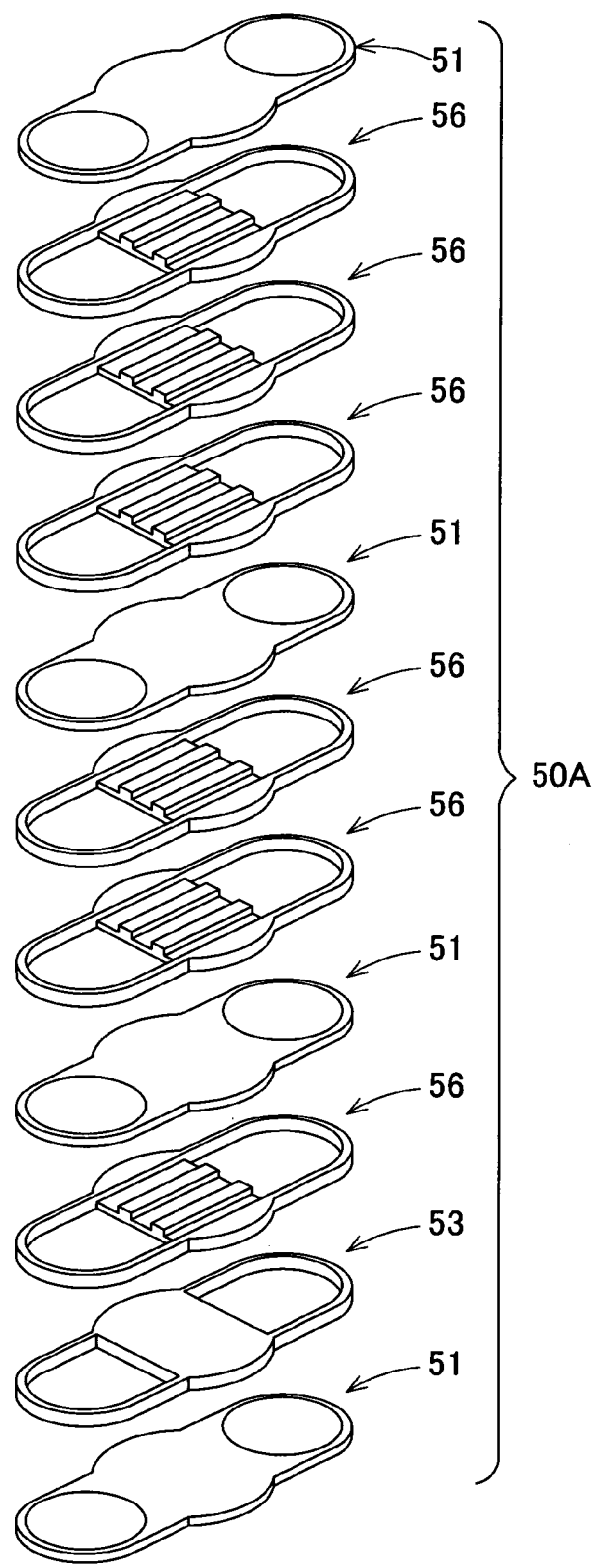
FIG. 13 is an exploded perspective view of a laminate shown in FIG. 12.

The laminate 50A will be described with reference to FIG. 13. FIG. 13 is an exploded perspective view showing the structure of the laminate 50A. As shown in the same figure, the laminate 50A is a laminate of a total of eleven thin sheets of three types. More specifically, the laminate 50A is formed by laminating and bonding a mesh sheet 51, a both-end opening sheet 53, a grooved both-end opening sheet 56, a mesh sheet 51, two grooved both-end opening sheets 56, a mesh sheet 51, three grooved both-end opening sheets 56, and a mesh sheet 51, successively from below. That is, the laminate 50A uses the both-end opening sheet 53 and the grooved both-end opening sheets 56 instead of the spacers 52 in the laminate 50.

Figure 14A:
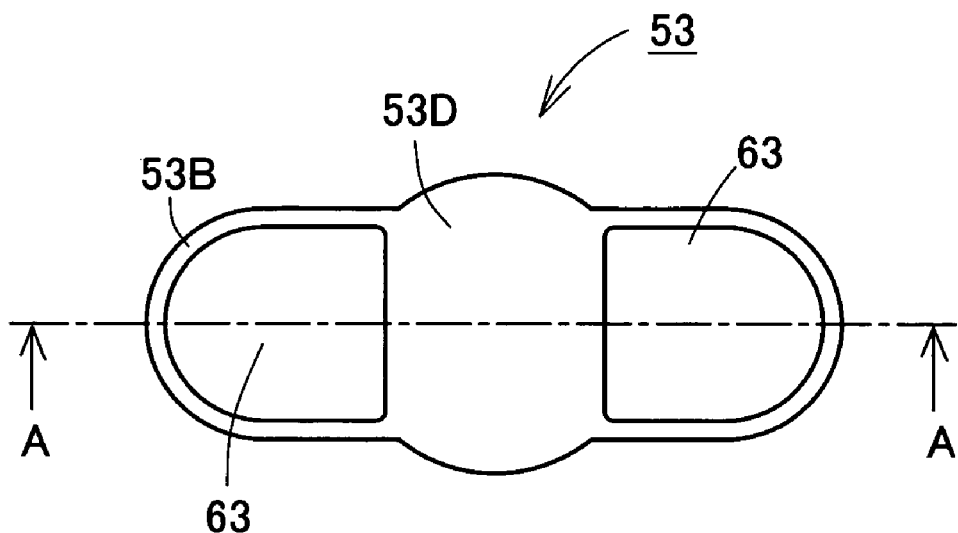
FIG. 14A is a plan view showing a both-end opening sheet.
Figure 14B:
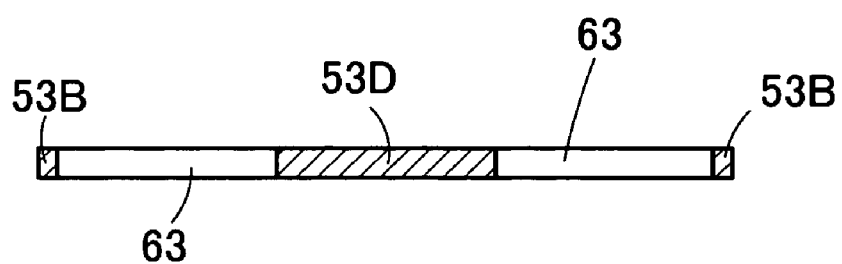
FIG. 14B is a sectional view taken on line A—A in FIG. 14A.

The both-end opening sheet 53 will now be described with reference to FIGS. 14A and 14B. FIG. 14A is a plan view of the both-end opening sheet 53 and FIG. 14B is a sectional view taken on line A—A in FIG. 14A. As shown in FIGS. 14A and 14B, the both-end opening sheet 53 has been etched so that outer periphery portions 53B and a central portion 53D are allowed to remain. Consequently, openings 63 are formed in both ends of the both-end opening sheet 53. The thickness of the both-end opening sheet 53 is 0.5 mm.

Figure 15A:
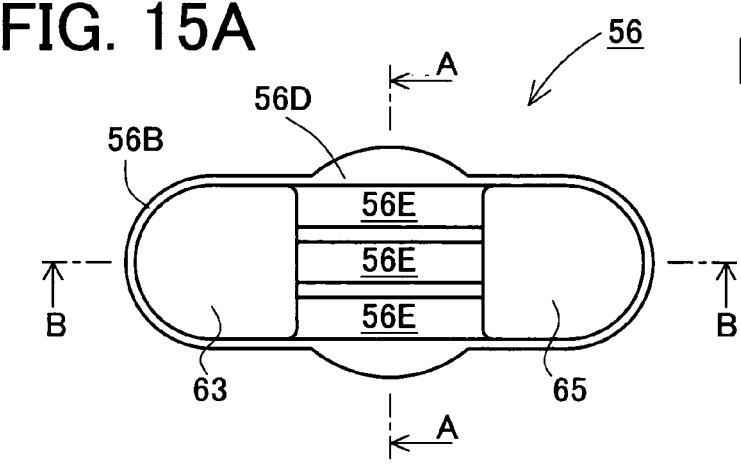
FIG. 15A is a plan view showing a grooved both-end opening sheet.
Figure 15B:
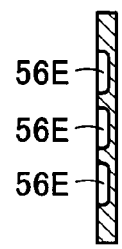
FIG. 15B is a sectional view taken on line A—A in FIG. 15A.
Figure 15C:
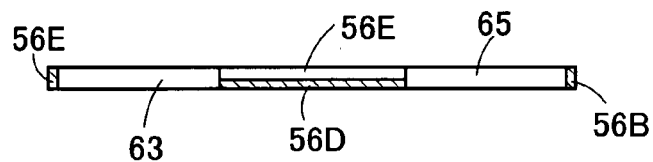
FIG. 15C is a sectional view taken on line B—B in FIG. 15A.

The grooved both-end opening sheet 56 will now be described with reference to FIGS. 15A to 15C. FIG. 15A is a plan view of the grooved both-end opening sheet 56, FIG. 15B is a sectional view taken on line A—A in FIG. 15A, and FIG. 15C is a sectional view taken on line B—B in FIG. 15A. As shown in FIG. 15, the grooved both-end opening sheet 56 has been etched so that grooves 56E are formed in a central portion 56D while allowing outer periphery portions 56B and the central portion 56D are allowed to remain. That is, in the grooved both-end opening sheet 56, grooves 56E are formed in the central portion 53D (see FIG. 14A) of the both-end opening sheet 53. Three grooves 56E are formed on each of both surface and back of the central portion 56D. The depth and width of each groove 56E are 0.35 mm and 1.1 mm, respectively. The spacing between adjacent grooves 56E is 0.2 mm. The thickness of the grooved both-end opening sheet 56 is 0.5 mm.

The laminate 50A thus formed by laminating and bonding the mesh sheets 51, the both-end opening sheets 53 and the grooved both-end opening sheets 56 as in FIG. 13 is fitted in the channel space 44 formed in the body 41. As a result, as shown in FIG. 12, the sectional area of the main channel M is diminished by the central portion 53D of the both-end opening sheet 53 and the central portions 56D of the grooved both-end opening sheet 56. In this way the bypass ratio of the fluid under measurement varies and the full-scale flow rate becomes 1 L/min. Thus, an arbitrary flow rate range can be set by changing the construction of the laminate.

Next, a description will be given of the operation of the thermal flowmeters 1 and 1A having the above constructions. In the thermal flowmeters 1 and 1A, in case of a forward flow, the fluid under measurement which has entered the inlet channel 43 through the inlet port 42 divided in the channel space 44 into a fluid portion flowing into the main channel M and a fluid portion flowing into the sensor channel S. The fluid portion flowing out from the main channel M and the fluid portion flowing out from the sensor channel S join together and flow out from the outlet port 46 to the exterior of the body 41 through the outlet channel 45.

On the other hand, in case of a reverse flow, the fluid under measurement which has entered the outlet channel 45 through the outlet port 46 is divided in the channel space 44 into a fluid portion flowing into the main channel M and a fluid portion flowing into the sensor channel S. The fluid portions flowing out from the main channel M and the sensor channel S join together and flow out from the inlet port 42 to the exterior of the body 41 through the inlet channel 43.

No matter in which of forward and reverse directions the fluid under measurement may flow, the fluid supposed to flow into the sensor channel S passes through the three layers of mesh portions 51M in the laminate 50 or 50A and thereafter flows into the sensor channel S. Thus, the flow of the fluid under measurement is regulated to a satisfactory extent and in this state the fluid flows through the sensor channel S.

The fluid flowing through the sensor channel S derives heat from the heating resistor Rh which is mounted bridgewise over the sensor channel S. Then, the fluid temperature sensing resistor Rt and the heating resistor Rh are controlled so as to give a constant temperature difference by means of an electric circuit (the constant temperature difference circuit shown in FIG. 10) formed on the back side of the sensor substrate 21.

Further, a midpoint potential Vout between the upstream temperature sensing resistor R1 and the downstream temperature sensing resistor R2 which are connected in series and supplied with a constant voltage Vc, is outputted as a measurement signal. At this time, when the fluid under measurement flows in the forward direction, the temperature (resistance value) of the upstream temperature sensing resistor R1 drops, while the temperature (resistance values) of the downstream temperature sensing resistor R2 rises, so that the midpoint potential Vout increases. On the other hand, when the fluid under measurement flows in the reverse direction, the temperature (resistance value) of the upstream temperature sensing resistor R1 rises and that of the downstream temperature sensing resistor R2 drops, so that the midpoint potential Vout decreases. In this way it is possible to detect the flowing direction of the fluid under measurement.

Figure 16:
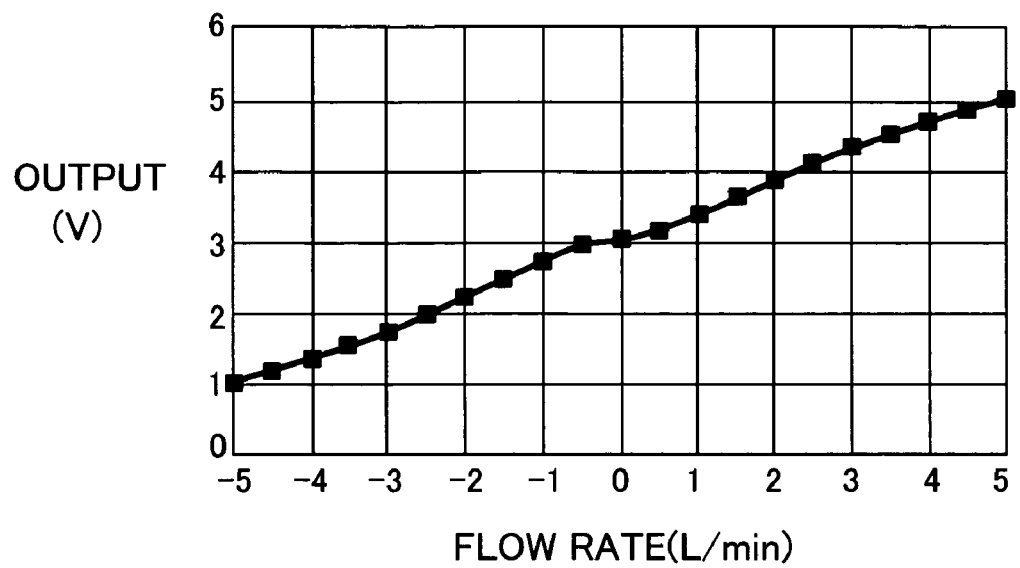
FIG. 16 illustrates an output characteristic of the thermal flowmeter of the first embodiment.
Figure 17:
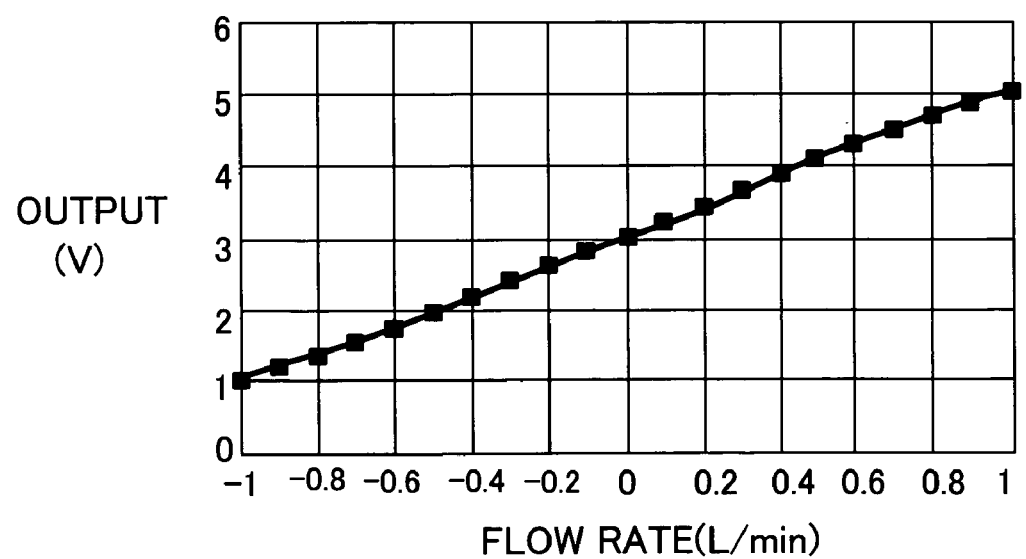
FIG. 17 illustrates an output characteristic of the thermal flowmeter according to the modification.

An example of output obtained at this time is shown in FIGS. 16 and 17. FIGS. 16 and 17 show the relationship between flow rate and output voltage. The graph of FIG. 16 represents the output from the thermal flowmeter 1, while the graph of FIG. 17 represents the output from the thermal flowmeter 1A.

As is seen from FIGS. 16 and 17, when the fluid under measurement flows in the forward direction, the output increases as the flow rate becomes larger. Conversely, when the fluid flows in the reverse direction, the output decreases as the flow rate becomes larger. In this way the flowing direction of the fluid under measurement can be detected by the thermal flowmeters 1 and 1A.

Figure 34:
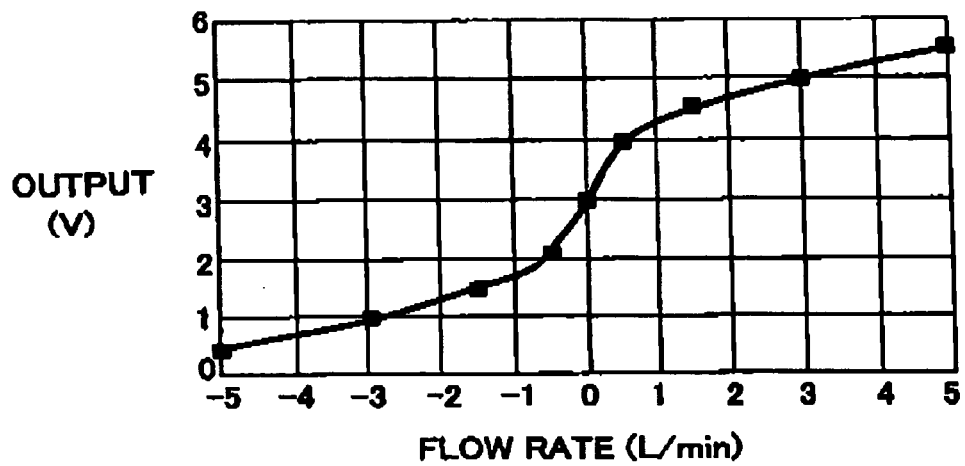
FIG. 34 illustrates an output characteristic of a conventional thermal flowmeter capable of sensing a flow rate in either direction.

It is also seen that the output characteristics of the thermal flowmeters 1 and 1A are greatly improved in linearity over the output characteristics (FIG. 34) of a conventional thermal flowmeter (the one disclosed in Japanese Unexamined Patent Publication No. 2002-5717). That is, according to the thermal flowmeters 1 and 1A it is possible to obtain linear output characteristics. This is because the main channel M is constituted by the laminate 50 (50A) and an optimum bypass ratio is set for each measurement range. Thus, with the thermal flowmeters 1 and 1A, the flow rate of the fluid under measurement can be measured accurately. Consequently, management against nozzle clogging can be done accurately.

Figure 18:
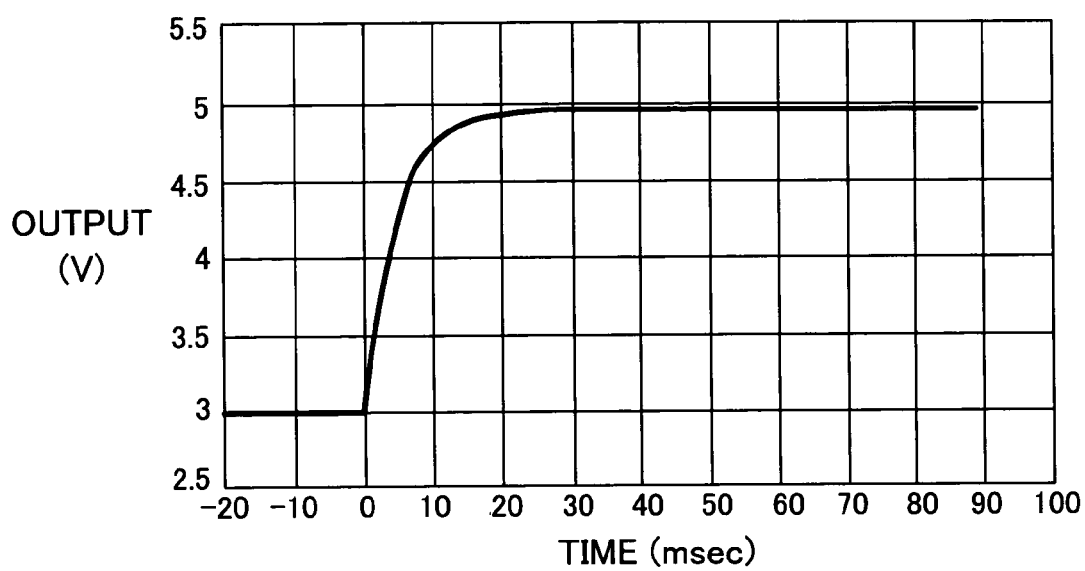
FIG. 18 illustrates the relationship between an output characteristic and time with respect to the thermal flowmeter of the first embodiment.
Figure 35:
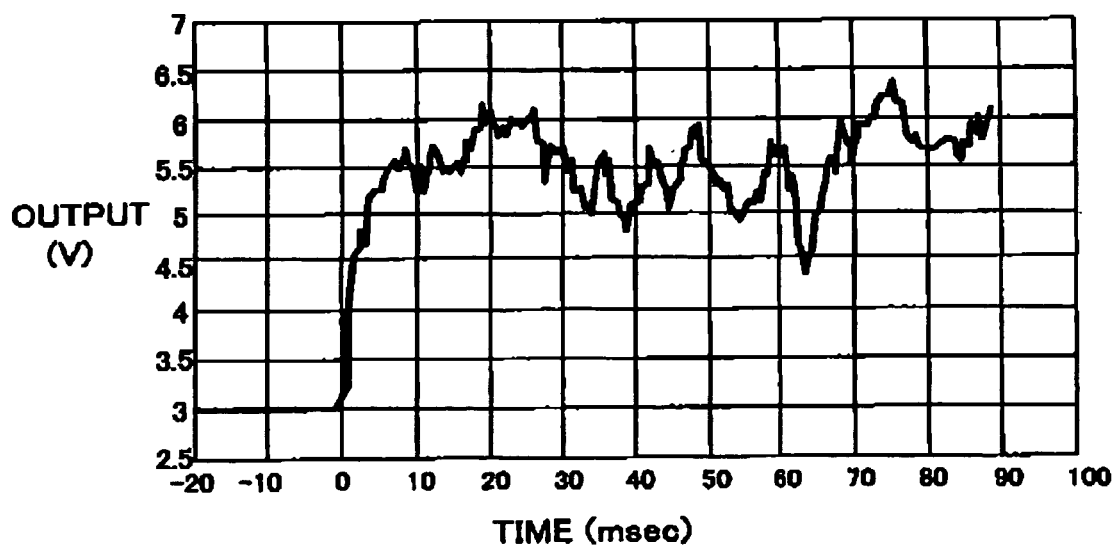
FIG. 35 illustrates the relationship between an output characteristic and time thereof.

Another output example of the thermal flowmeter 1 is shown in FIG. 18. FIG. 18 shows the relationship between time and output voltage. As is seen from FIG. 18, the output of the thermal flowmeter 1 is stable with little fluctuation in comparison with the output (FIG. 35) of the conventional thermal flowmeter (disclosed in Japanese Unexamined Patent Publication No. 2002-5717). That is, according to the thermal flowmeter 1 it is possible to obtain a very stable output with a small oscillation width. Besides, the response characteristic is not impaired because an electric filter is not used.

When the ratio to the output value of such an oscillation width is defined to be noise, the noise in the conventional thermal flowmeter is "±39.5 (% FS)," while the noise in the thermal flowmeter of the first embodiment is "±0.7 (% FS)." That is, according to the thermal flowmeter 1A, the noise can be reduced to about one fiftieth. This is because the flow of the fluid under measurement flowing through the sensor channel S is a very regulated flow.

Thus, according to the thermal flowmeter 1 it is possible to obtain a stable output and hence threshold value for the confirmation of suction can be set high. Consequently, the confirmation of suction can be done with a high accuracy. Moreover, even in case of using a collet type nozzle, it is possible to effect the confirmation of suction.

Although reference has been made to the thermal flowmeter 1, it goes without saying that the same effects as above can be obtained also in the use of the thermal flowmeter 1A which is smaller in full-scale flow rate than the thermal flowmeter 1. This is because the output fluctuates less as the measured flow rate becomes smaller.

Figure 19:
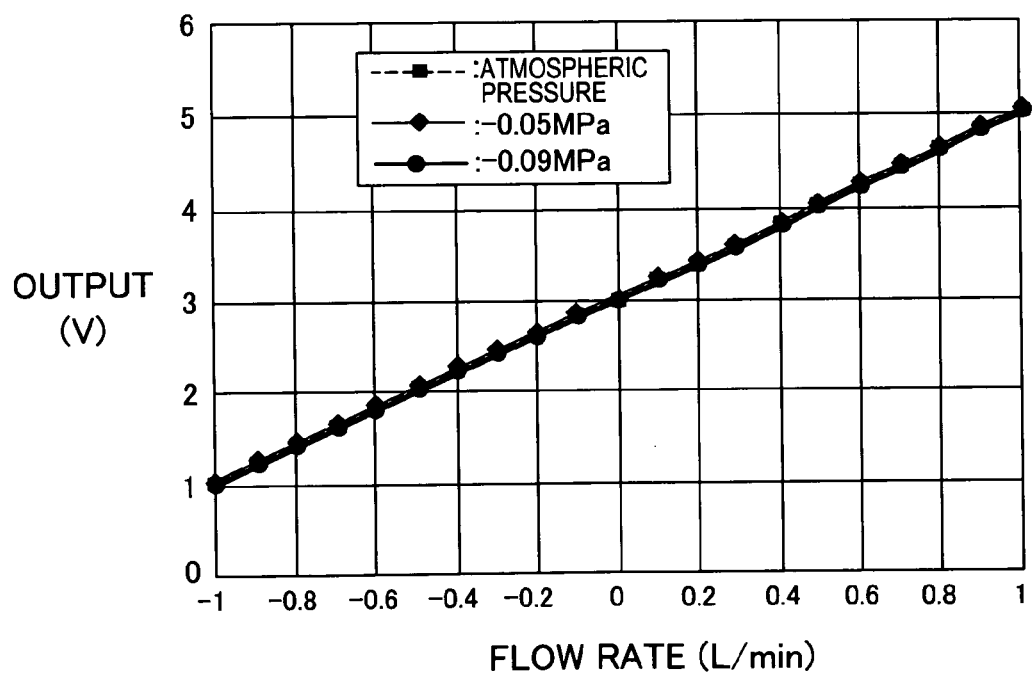
FIG. 19 is a diagram for explaining an output characteristic of the thermal flowmeter according to the modification.

A further output example of the thermal flowmeter 1A is shown in FIG. 19. FIG. 19 shows how output changes with a change in pressure. As is seen from FIG. 19, the thermal flowmeter 1A is superior in pressure characteristic than a conventional thermal flowmeter (the one disclosed in Japanese Patent Application No. 2000-368801). According to the thermal flowmeter 1A, even if a change in pressure occurs, the output does not drift and it is possible to measure an exact flow rate constantly. The same result was obtained also with respect to the thermal flowmeter 1.

That the pressure characteristic has thus been improved is for the following reason. According to the conventional method (Japanese Patent Application No. 2000-368801), since the delivery/receipt itself of heat between the heating resistor Rh and the fluid is used as output, a change in pressure, i.e., a change in gas density, causes a change in output. On the other hand, according to the thermal flowmeter 1A, when pressure changes, the delivery/receipt of heat between the heating resistor Rh and the fluid changes, but the resistance value of the upstream temperature sensing resistor R1 and that of the downstream temperature sensing resistor R2 also change in the same manner. For this reason, the midpoint potential Vout between both resistors R1 and R2 does not change. Therefore, even a change in pressure does not exert any influence on output.

Thus, the thermal flowmeters 1 and 1A can measure a flow rate in either direction, and the measured output is always stable without impairment of the response characteristic (about 20 msec). Therefore, when the thermal flowmeter 1 (1A) is used in confirming suction or release of vacuum suction in handling a semiconductor chip at the time of mounting the chip, it is possible to determine accurately whether the chip is in a chucked state or in a released state. This is because the flow rate in orifice in suction and that in non-suction can be determined accurately and stably in an instant. Thus, by utilizing the thermal flowmeters 1 and 1A in conforming suction and release, the confirmation of suction and that of release can be determined accurately without the possibility of non-suction being determined by mistake despite an actual state of suction. Consequently, the handling work for handling a semiconductor chip (e.g., 0.5 mm square) at the time of mounting the chip which has been becoming smaller in size recently, can be done in a very efficient manner.

In the thermal flowmeters 1 and 1A according to this embodiment, as described above, by fitting the laminate 50 (50A) in the channel space 44 formed in the body 41 to constitute the main channel M, it is possible to set an optimum bypass ratio of the fluid under measurement and hence possible to obtain a linear output characteristic. Moreover, the laminate 50 (50A) is provided with three layers of mesh portions 51M disposed between the main channel M and the sensor channel S. With this construction, the flow of the fluid under measurement flowing into the sensor channel S is regulated. Consequently, it is possible to obtain a very stable output. Further, the upstream temperature sensing resistor R1, the downstream temperature sensing resistor R2, the heating resistor Rt, and the fluid temperature sensing resistor Rt, are provided on the measurement chip 11, a control is made by the electric circuit so as to give a constant temperature difference between the heating resistor Rh and the fluid temperature sensing resistor Rt, and the flow rate of the fluid under measurement is measured based on a temperature difference between the upstream and downstream temperature sensing resistors R1, R2. Thus, the flow rate can be detected in either direction.

Second Embodiment

Figure 20:
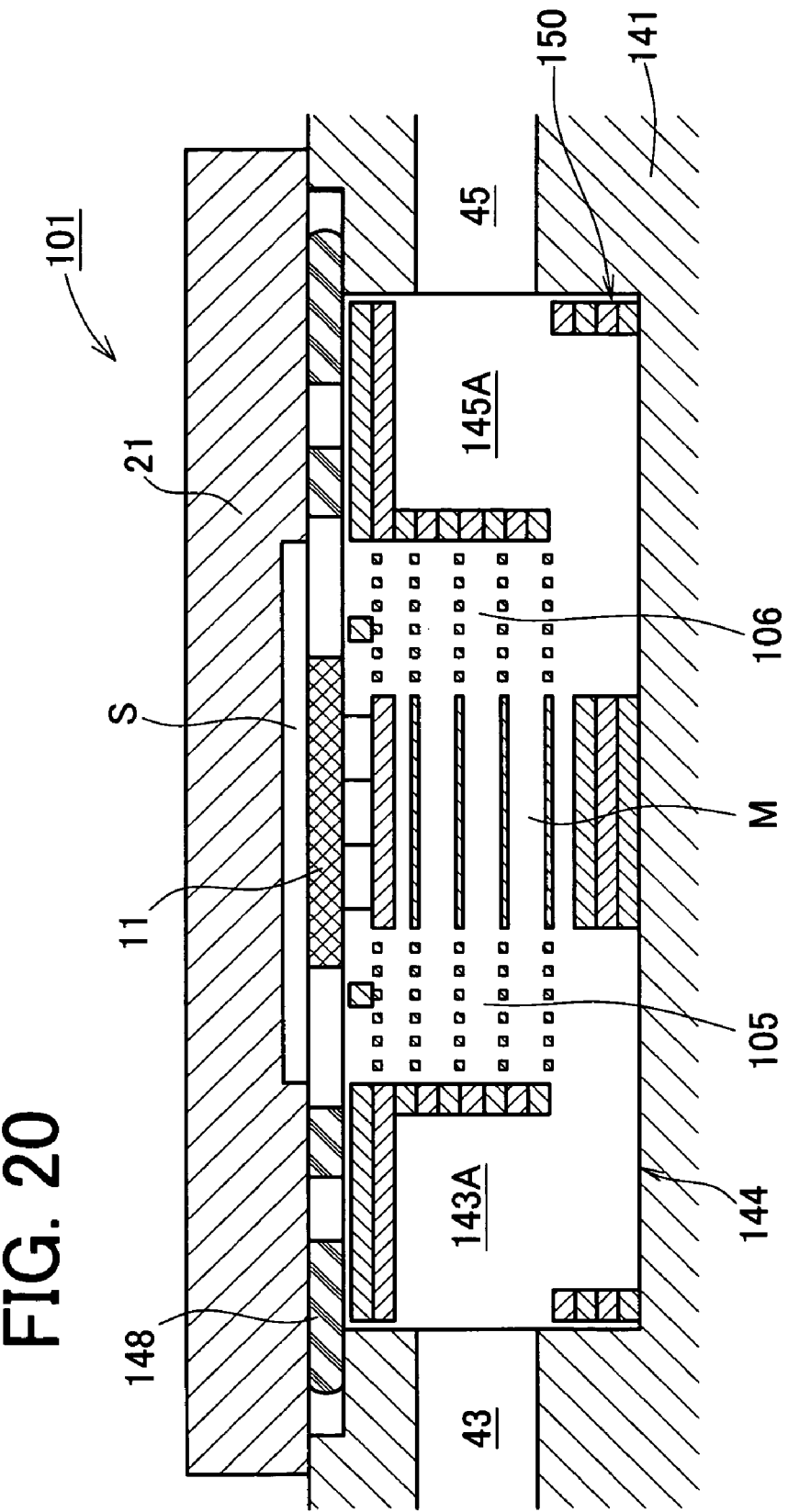
FIG. 20 is a schematic construction diagram of a thermal flowmeter according to a second embodiment of the present invention.

A second embodiment of the present invention will now be described. A schematic construction of a thermal flowmeter according to this second embodiment is shown in FIG. 20. As shown in the same figure, the thermal flowmeter of this second embodiment, indicated at 101, is the same in basic construction as the thermal flowmeter 1 of the first embodiment, but is different in the shape of body in order to attain a further reduction of size. Thin sheets which constitute a laminate used in this second embodiment are also different in shape. Therefore, the different points from the first embodiment will mainly be described below. The same constructional points as in the first embodiment are identified by the same reference numerals as in the first embodiment, and explanations thereof will be omitted suitably.

Figure 21:
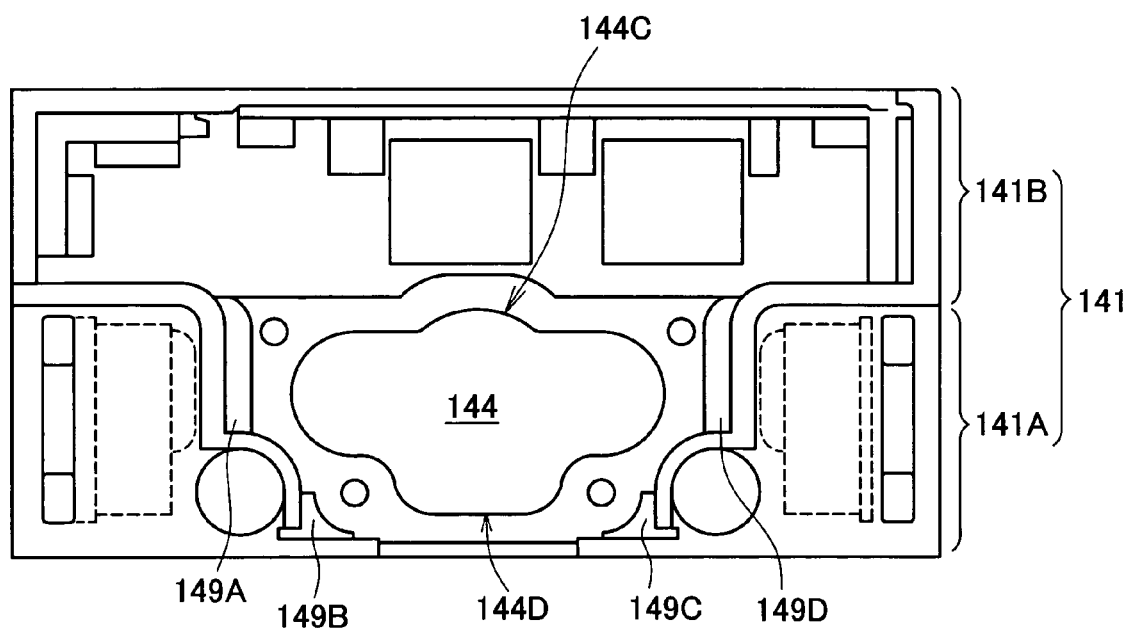
FIG. 21 is a plan view of a body.

First, a description will be given of a body in this second embodiment with reference to FIGS. 20 and 21. FIG. 21 is a plan view of the body. As shown in FIG. 21, the body, indicated at 141, is roughly composed of a flow rate measuring section 141A in which a main channel M and a sensor channel S for the flow of a fluid under measurement are formed and an electric parts receptacle section 141B for accommodating electric parts such as an amplifier circuit therein. A depth size (the size in a direction orthogonal to the fluid flowing direction) of the body 141 is almost equal to that of the body 44 described in the first embodiment.

A characteristic portion of this second embodiment resides in the flow rate measuring section 141A and therefore this section will be described in detail. In the flow rate measuring section 141A, as shown in FIG. 20, the body itself is not formed with elbow portions 43A and 45A unlike the body 41 described in the first embodiment, but an inlet channel 43 and an outlet channel 45 are in direct communication with a channel space 144. More specifically, both inlet channel 43 and outlet channel 45 are in direct communication with central portions of side faces of the channel space 144. By thus forming the inlet channel 43 and the outlet channel 45, the height can be made smaller than in the first embodiment. In this way the thermal flowmeter 101 is further reduced in size.

If elbow portions are not present, the influence of the incidence angle of the fluid under measurement flowing into the flowmeter on the output characteristic becomes greater. In this embodiment, therefore, elbow portions 143A and 145A are formed within the channel space 144 by a laminate 150 which will be described later. At the elbow portions 143A and 145A, the flow of the fluid under measurement flowing into the flowmeter is disturbed and the direction thereof is changed so that the fluid little influenced by the incidence angle can be allowed to flow into the sensor channel S.

A cross section of the channel space 144 has a shape such that both short sides of a rectangle are made arcuate (semicircular), as shown in FIG. 21. An arcuate convex portion 144C is formed at one of central portions of the long sides, while a flat convex portion 144D is formed at the other central portion. The convex portions 144C and 144D are for positioning the laminate 150 (thin sheets 151 to 157). Further, four convex portions 149A, 149B, 149C, and 149D for positioning a seal packing 148 are formed at an upper surface portion of the channel space 144.

Figure 22:
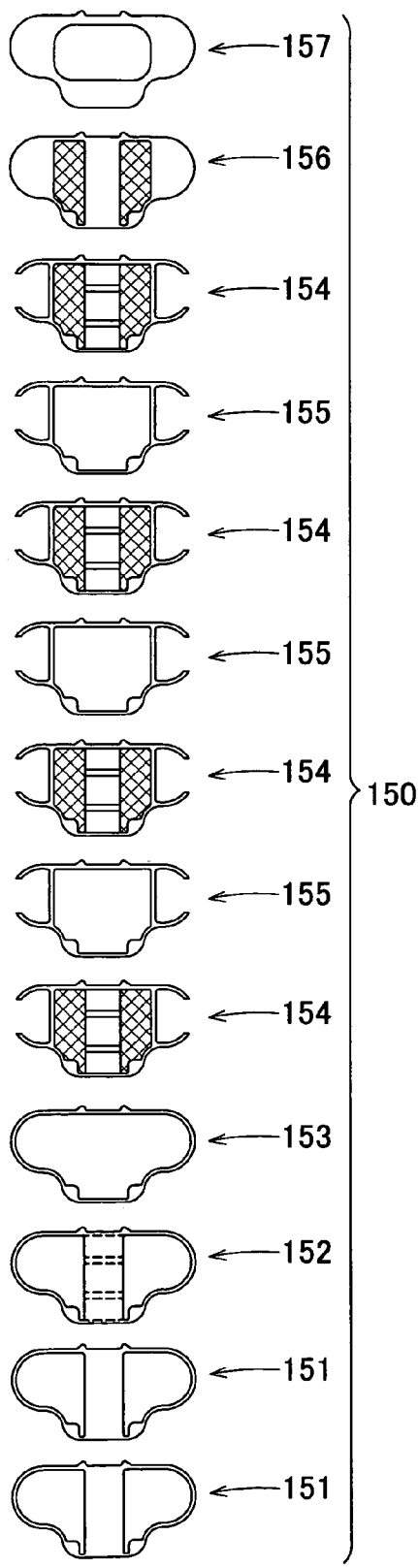
FIG. 22 is a construction diagram of a laminate shown in FIG. 20.

Reference will now be made to the laminate 150 which is fitted in the channel space 144. As shown in FIG. 22, the laminate 150 is a laminate of a total of thirteen thin sheets of seven types. FIG. 22 shows in what order the thin sheets of the laminate 150 are laminated. The laminate 150 is formed by laminating and bonding, successively from below, two both-end opening sheets 151, a grooved both-end opening sheet 152, a first spacer 153, a first mesh sheet 154, a second spacer 155, a first mesh sheet 154, a second spacer 155, a first mesh sheet 154, a second spacer 155, a first mesh sheet 154, a second mesh sheet 156, and a central opening sheet 157. The thin sheets 151 to 157 are 0.3 mm or so in thickness and have been etched (micromachined) in various shapes. Their projected shapes are almost the same as the cross-sectional shape of the channel space 144. Consequently, the laminate 150 is fitted in the channel space 144 closely without leaving any clearance.

Figure 23A:
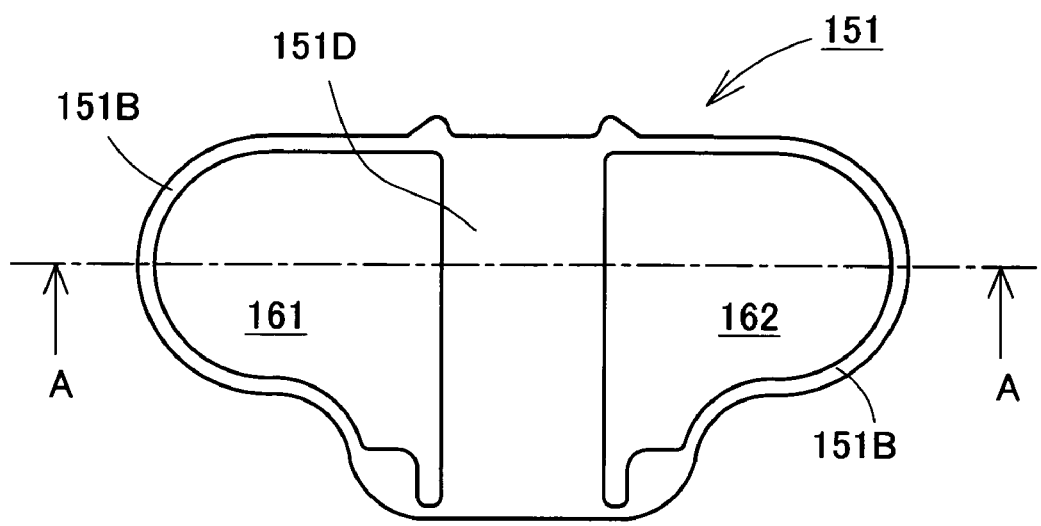
FIG. 23A is a plan view showing a both-end opening sheet.
Figure 23B:
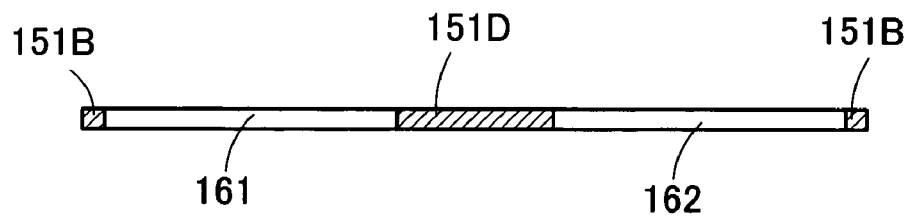
FIG. 23B is a sectional view taken on line A—A in FIG. 23A.

Reference will now be made to individual thin sheets which constitute the laminate 150. A description will first be given of the both-end opening sheet 151 with reference to FIGS. 23A and 23B. FIG. 23A is a plan view of the both-end opening sheet 151 and FIG. 23B is a sectional view taken on line A—A in FIG. 23A. As shown in FIGS. 23A and 23B, the both-end opening sheet 151 has been etched so that outer periphery portions 151B and a central portion 151D are allowed to remain, whereby openings 161 and 162 are formed at both ends of the both-end opening sheet 151.

Figure 24A:
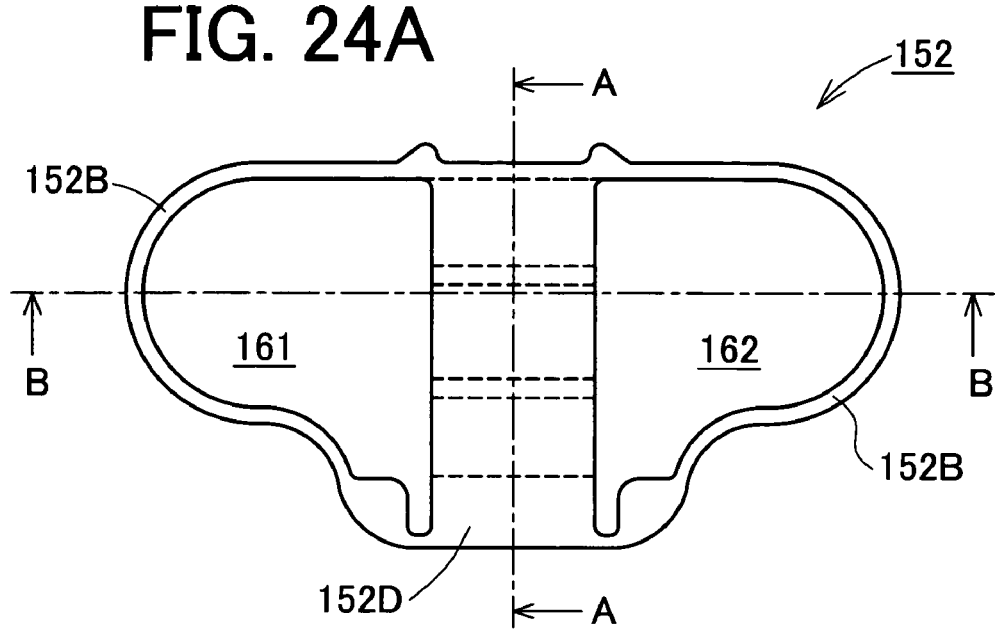
FIG. 24A is a plan view showing a grooved both-end opening sheet.

The grooved both-end opening sheet 152 will now be described with reference to FIGS. 24A to 24C. FIG. 24A is a plan view of the grooved both-end opening sheet 152, FIG. 24B is a sectional view taken on line A—A in FIG. 24A, and FIG. 24C is a sectional view taken on line B—B in FIG. 24A.

Figure 24B:
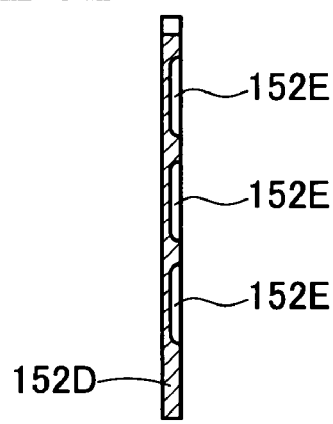
FIG. 24B is a sectional view taken on line A—A in FIG. 24A.
Figure 24C:
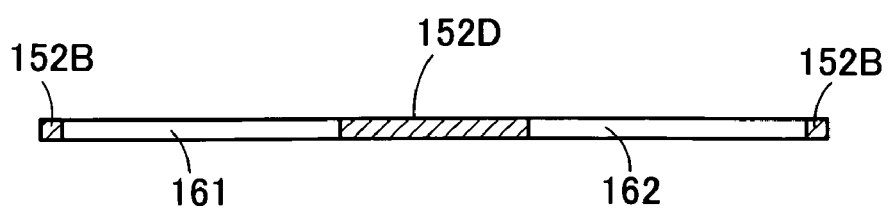
FIG. 24C is a sectional view taken on line B—B in FIG. 24A.

As shown in FIGS. 24A and 24B, the grooved both-end opening sheet 152 has been etched so that outer periphery portions 152B and a central portion 152D are allowed to remain and grooves 152E are formed in the central portion 152D. Thus, the grooved both-end opening sheet 152 is fabricated by forming grooves 152E in the central portion 151D (see FIG. 23A) of the both-end opening sheet 151. Three grooves 152E are formed in the central portion 152D. The depth and width of each groove 152E is 0.1 mm and 1.4 mm, respectively. The spacing between adjacent grooves 152E is 0.425 mm. The grooved both-end opening sheet 152 is also formed with openings 161 and 162, as shown in FIGS. 24A and 24C.

Figure 25A:
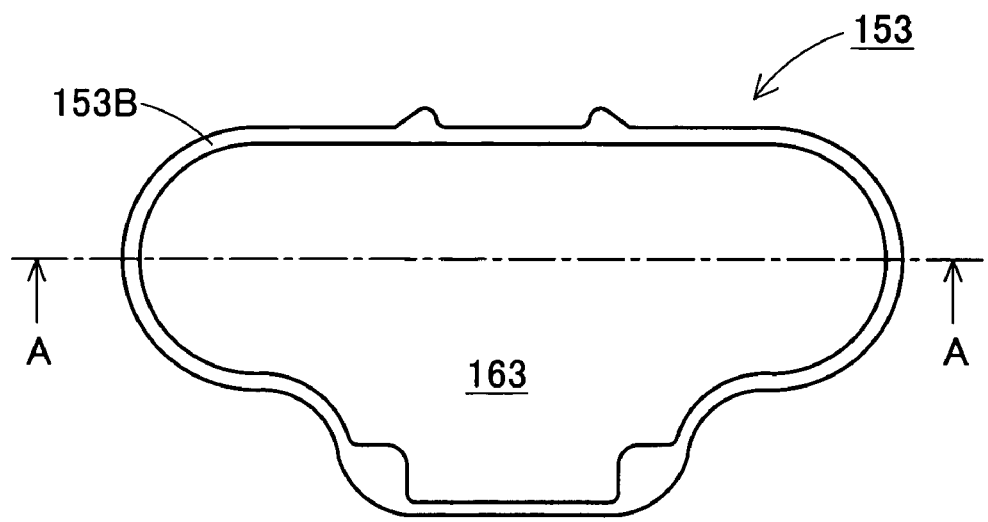
FIG. 25A is a plan view showing a first spacer.
Figure 25B:
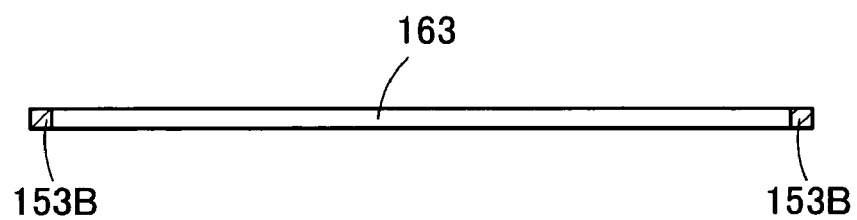
FIG. 25B is a sectional view taken on line A—A in FIG. 25A.

The first spacer 153 will now be described with reference to FIGS. 25A and 25B. FIG. 25A is a plan view of the first spacer 153 and FIG. 25B is a sectional view taken on line A—A in FIG. 25A. As shown in FIGS. 25A and 25B, the first spacer 153 has been etched so that an outer periphery portion 153B is allowed to remain, whereby an opening 163 is formed in the first spacer 153.

Figure 26A:
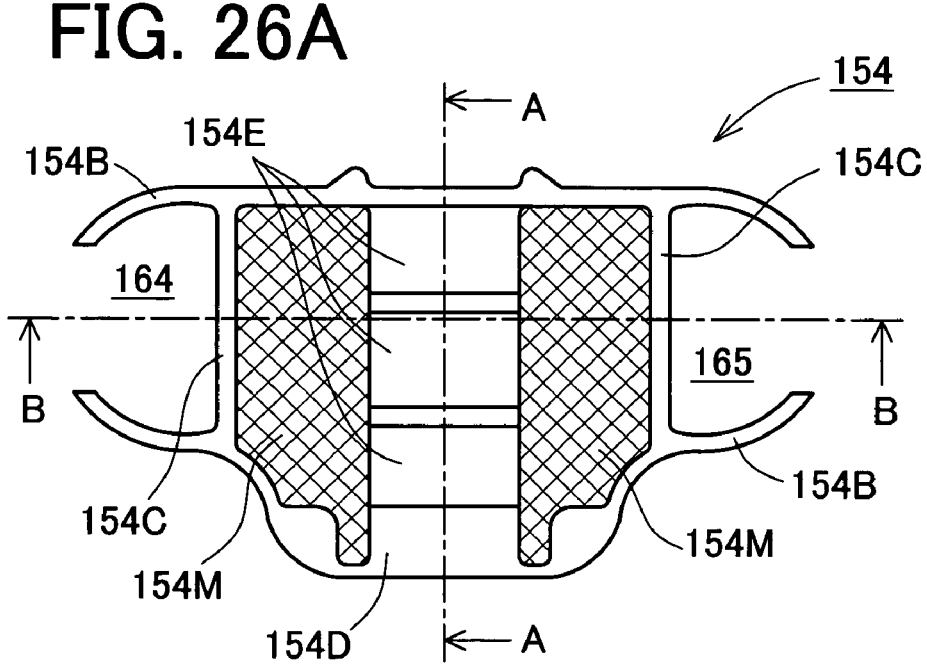
FIG. 26A is a plan view showing a first mesh sheet.
Figure 26B:
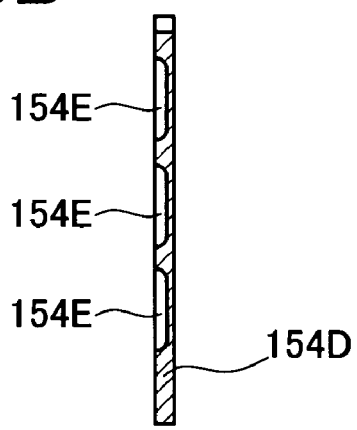
FIG. 26B is a sectional view taken on line A—A in FIG. 26A.
Figure 26C:
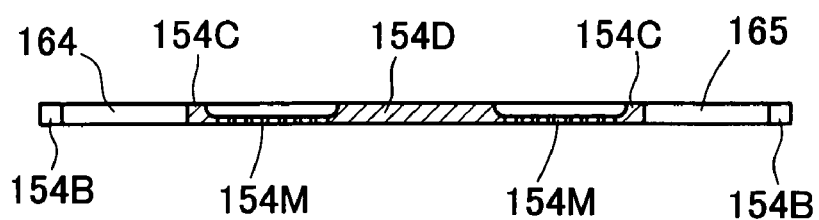
FIG. 26C is a sectional view taken on line B—B in FIG. 26A.

A description will now be given of the first mesh sheet 154 with reference to FIGS. 26A to 26C. FIG. 26A is a plan view of the first mesh plate 154, FIG. 26B is a sectional view taken on line A—A in FIG. 26A, and FIG. 26C is a sectional view taken on line B—B in FIG. 26A. As shown in FIGS. 26A and 26B, the first mesh plate 154 has been etched so that outer periphery portions 154B, a central portion 154D, and shield portions 154C, are allowed to remain and grooves 152E are formed in the central portion 154D and so that mesh portions 154M are formed between the central portion 154D and the shield portions 154C. Both-end arcuate portions of the outer periphery portions 154B are partially cut out by etching. The reason for such cut-out portions formation is because the cut-out portions are located in positions for communication with the inlet channel 43 and the outlet channel 45. In the first mesh sheet 154, as shown in FIGS. 26A and 26C, openings 164 and 165 are formed outside the mesh portions 154M in a sandwiching relation to the shield portions 154C. The construction of the mesh portions 154M is the same as that of the mesh portions 51M.

Figure 27A:
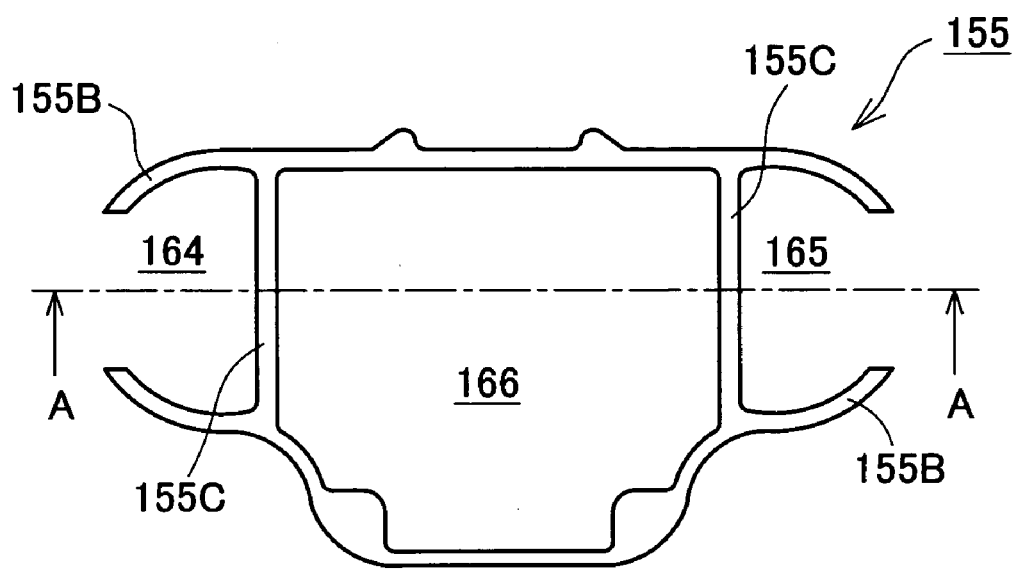
FIG. 27A is a plan view showing a second spacer.
Figure 27B:
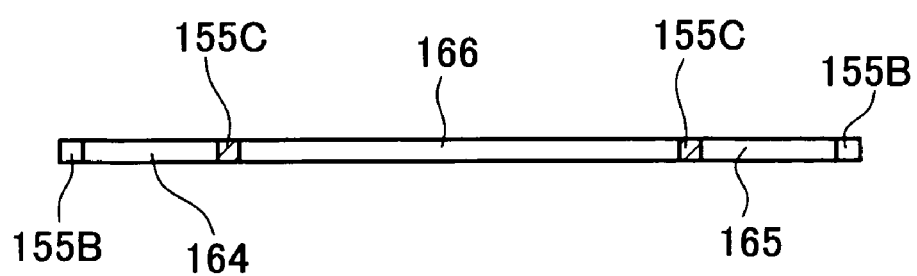
FIG. 27B is a sectional view taken on line A—A in FIG. 27A.

The second spacer 155 will now be described with reference to FIGS. 27A and 27B. FIG. 27A is a plan view of the second spacer 155 and FIG. 27B is a sectional view taken on line A—A in FIG. 26A. As shown in FIGS. 27A and 27B, the second spacer 155 has been etched so as to form outer periphery portions 155B and shield portions 155C. That is, the central portion 154D and the mesh portions 154M (see FIG. 26A) in the first mesh sheet 154 are not provided in the second spacer 155. According to this construction, an opening 166 is newly formed. Openings 164 and 165 are also formed in the second spacer 155, as shown in FIGS. 27A and 27B.

Figure 28A:
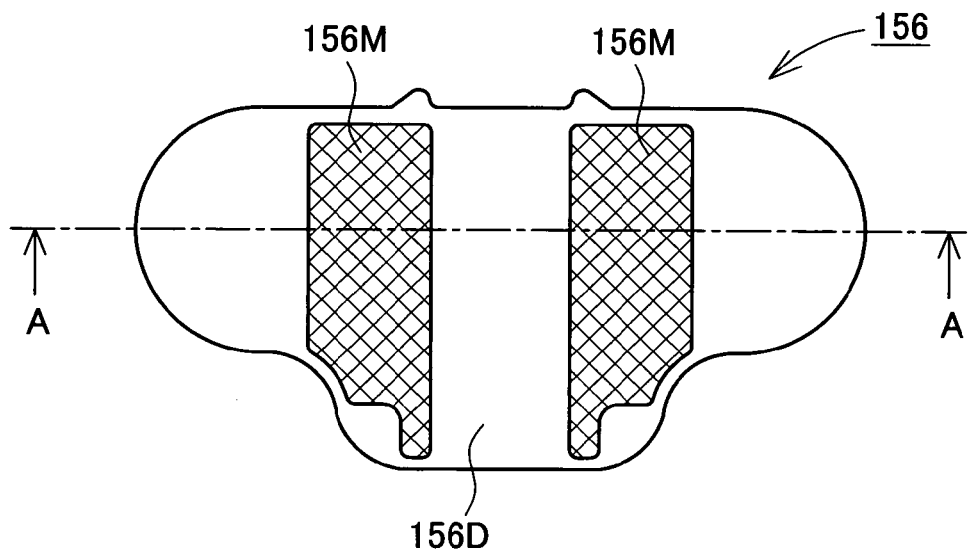
FIG. 28A is a plan view showing a second mesh sheet.
Figure 28B:
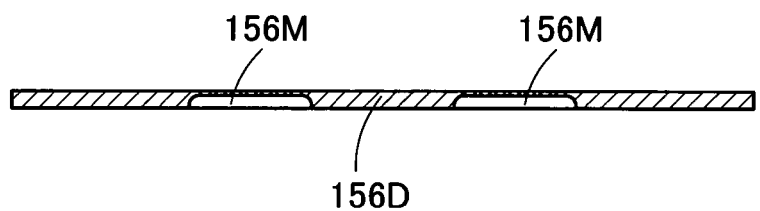
FIG. 28B is a sectional view taken on line A—A in FIG. 28A.

The second mesh sheet 156 will now be described with reference to FIGS. 28A and 28B. FIG. 28A is a plan view of the second mesh sheet 156 and FIG. 28B is a sectional view taken on line A—A in FIG. 28A. As shown in FIGS. 28A and 28B, the second mesh sheet 156 has been etched so that mesh portions 156M are formed on the sides of a central portion 156D. The construction of the mesh portions 156M is also the same as that of the mesh portions 51M.

Figure 29A:
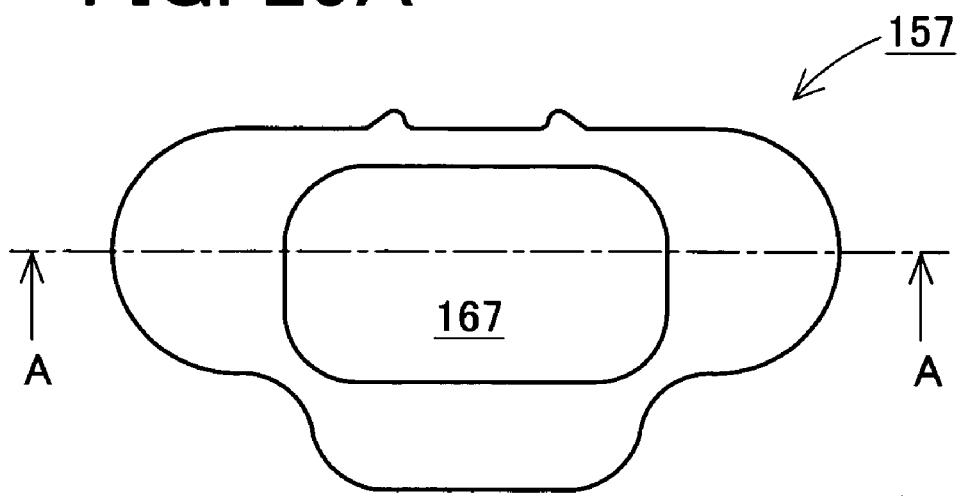
FIG. 29A is a plan view showing a central opening sheet.
Figure 29B:
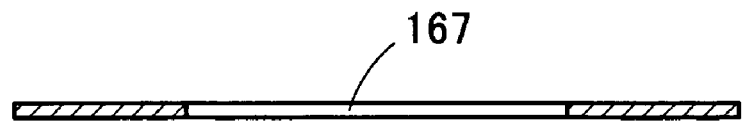
FIG. 29B is a sectional view taken on line A—A in FIG. 29A.
Figure 30:
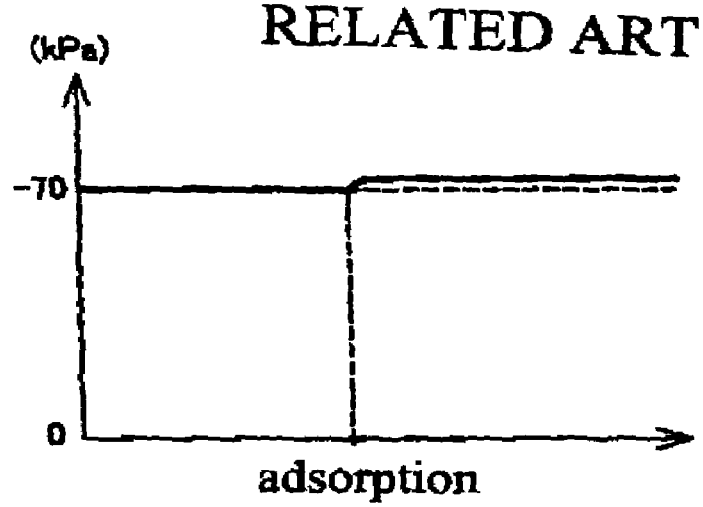
FIG. 30 illustrates a change in pressure between a state of non-suction and a state of suction in case of using a nozzle of a small diameter.
Figure 31:
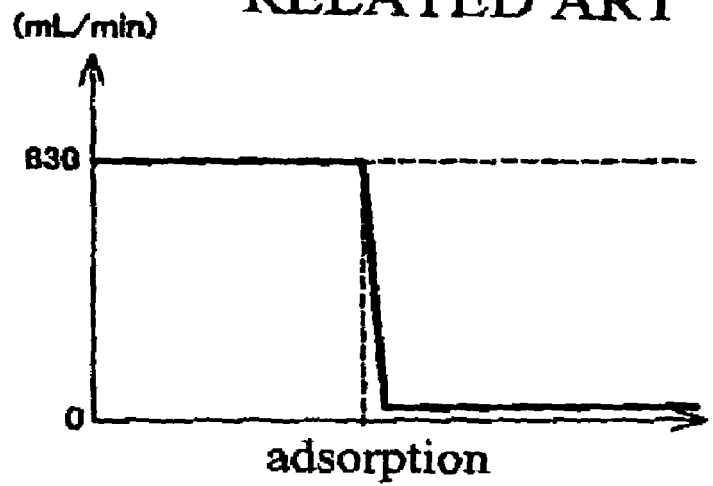
FIG. 31 illustrates a change in flow rate between a state of non-suction and a state of suction in case of using a nozzle of a small diameter.
Figure 32:
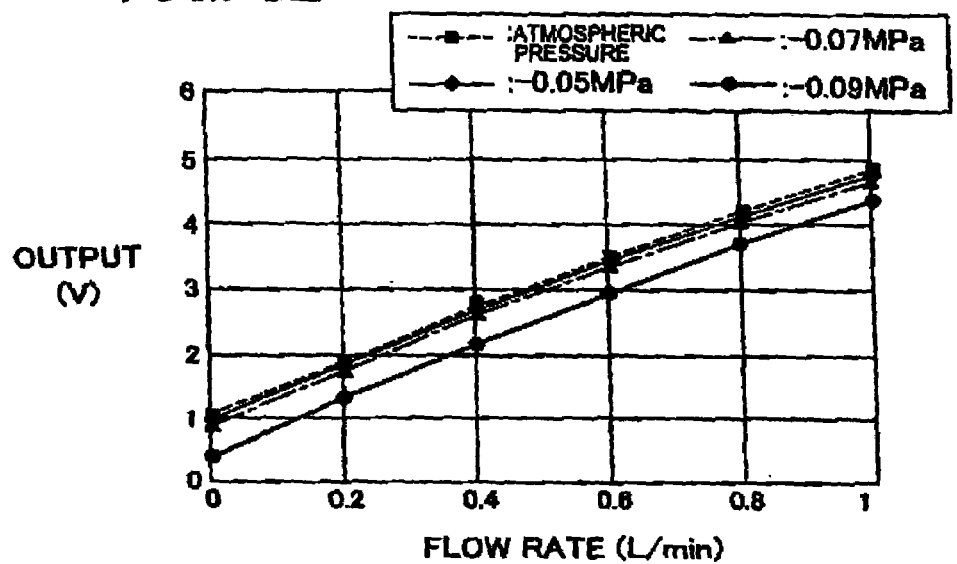
FIG. 32 illustrates a pressure characteristic of a conventional thermal flowmeter incapable of sensing a flow rate in either direction
Figure 33:
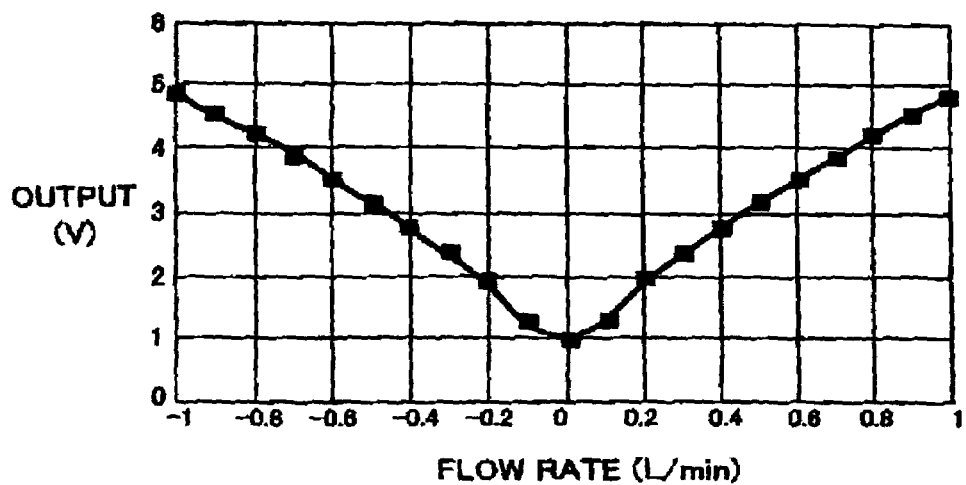
FIG. 33 illustrates an output characteristic thereof.

Lastly, the central opening sheet 157 will now be describe with reference to FIGS. 29A and 29B. FIG. 29A is a plan view of the central opening sheet 157 and FIG. 29B is a sectional view taken on line A—A in FIG. 29A. As shown in FIGS. 29A and 29B, the central opening sheet 157 has been etched so that a generally rectangular opening 167 is formed centrally.

Turning back to FIG. 20, the laminate 150 formed by combining, laminating and bonding the thin sheets 151 to 157 described above is fitted in the channel space 144, whereby elbow portions 143A, 145A, communication channels 105, 106, and main channel M, are formed. More specifically, the elbow portion 143A is formed by the opening 164 and shield portions 154C of the first mesh sheet 154 and the opening 164 and shield portions 155C of the second spacer 155. The elbow portion 145A is formed by the opening 165 and shield portions 154C of the first mesh sheet 154 and the opening 165 and shield portions 155C of the second spacer 155. The main channel M is formed by the grooves 154E of the first mesh sheet 154 and the opening 166 of the second spacer 155.

The communication channel 105 is formed by the opening 161 of the both-end opening sheet 151, the opening 161 of the grooved both-end opening sheet 152, the opening 163 of the first spacer 153, the mesh portions 154M of the first mesh sheet 154, the opening 166 of the second spacer 155, the mesh portions 156M of the second mesh sheet 156, and the opening 167 of the central opening sheet 157. The communication channel 106 is formed by the opening 162 of the both-end opening sheet 151, the opening 162 of the grooved both-end opening sheet 152, the opening 163 of the first spacer 153, the mesh portions 154M of the first mesh sheet 154, the opening 166 of the second spacer 155, the mesh portions 156M of the second mesh sheet 156, and the opening 167 of the central opening sheet 157. The communication channel 105 is for making the elbow portion 143A communicate with the main channel M and the sensor channel S, while the communication channel 106 is for making the elbow portion 145A communicate with the main channel M and the sensor channel S.

In the communication channels 105 and 106, four layers of mesh portions 154M and one layer of mesh portion 156M are disposed between the main channel M and the sensor channel S. That is, a total of five layers of mesh portions are disposed between the main channel M and the sensor channel S. With these mesh portions, the fluid under measurement can be allowed to flow in a flow-regulated state into the sensor channel S. This is because the turbulence of flow of the fluid under measurement is diminished every time the fluid passes though the mesh portions 154M and 156M.

Next, the operation of the thermal flowmeter 101 having the above construction will be described. In the thermal flowmeter 101, the fluid under measurement flows in the forward direction, the fluid which has entered the inlet channel 43 is divided in the channel space 144 into a fluid portion flowing into the main channel M and a fluid portion flowing into the sensor channel S. Then, the fluid portions flowing out from the main channel M and the sensor channel S join together and flow out to the exterior of the body 141 from the outlet channel 45.

On the other hand, when the fluid under measurement flows in the reverse direction, the fluid which has entered the outlet channel 45 is divided in the channel space 144 into a fluid portion flowing into the main channel M and a fluid portion flowing into the sensor channel S. Then, the fluid portions flowing out from the main channel M and the sensor channel S join together and flow out to the exterior of the body 141 from the inlet channel 43. Also in the thermal flowmeter 101, as is the case with the thermal flowmeter of the first embodiment, the bypass ratio can be changed as desired by changing the combination and shape of the thin sheets 151 to 157 which constitute the laminate 150.

No matter in which of forward and reverse directions the fluid under measurement may flow, the fluid flowing into the sensor channel S passes through the five layers of mesh portions (four layers of mesh portions 154M and one layer of mesh portion 156M) in the laminate 150 and thereafter flows into the sensor channel S. Consequently, the flow of the fluid under measurement is regulated to a satisfactory extent and in this state the fluid flows through the sensor channel S.

The fluid under measurement flowing through the sensor channel S derives heat from the heating resistor Rh which is mounted bridgewise over the sensor channels. Then, the electric circuit (the constant temperature difference circuit shown in FIG. 10) provided on the back side of the sensor substrate 21 makes a control so as to give a constant temperature difference between the fluid temperature sensing resistor Rt and the heating resistor Rh.

Further, a midpoint potential Vout between the upstream temperature sensing resistor R1 and the downstream temperature sensing resistor R2 connected in series and supplied with the constant voltage Vc is outputted as a measurement signal by the electric circuit (the output circuit shown in FIG. 11) provided on the back side of the sensor substrate 21. At this time, when the fluid under measurement flows in the forward direction, the temperature (resistance value) of the upstream temperature sensing resistor R1 drops, while the temperature (resistance value) of the downstream temperature sensing resistor R2 rises, so that the midpoint potential Vout increases. On the other hand, when the fluid under measurement flows in the reverse direction, the temperature (resistance value) of the upstream temperature sensing resistor R1 rises, while the temperature (resistance value) of the downstream temperature sensing resistor R2 drops, so that the midpoint potential Vout decreases. Thus, it is possible to detect in which direction the fluid under measurement is flowing.

Also with the thermal flowmeter 101, like the thermal flowmeters 1 and 1A according to the first embodiment, not only a linear output characteristic could be obtained, but also it was possible to obtain a very stable output with a small output oscillation width. Moreover, even when the pressure of the fluid under measurement varied, an accurate flow rate could be measured constantly without drift of the output. Thus, according to the thermal flowmeter 101, not only it is possible to attain a further reduction of size and detect the flow rate in either direction, but also it is possible to obtain a linear output characteristic and provide a stable output without impairing the response characteristic.

According to the thermal flowmeter 101 of this second embodiment, as described above, the inlet and outlet channels 43, 45 and the channel space 144 are brought into direct communication with each other and the laminate 150 is fitted in the channel space 144, whereby the elbow portions 143A, 145A, the communication channels 105, 106 and the main channel M are constituted. Consequently, the size in the vertical direction is reduced and it is possible to attain a further reduction of size. In the thermal flowmeter 101, moreover, since an optimum bypass ratio of the fluid under measurement can be set by changing the combination of the thin sheets 151 to 157 which constitute the laminate 150, it is possible to obtain a linear output characteristic. Besides, the laminate 150 is provided with four layers of mesh portions 154M and one layer of mesh portion 156 which are disposed between the main channel M and the sensor channel S. With these mesh portions, the flow of the fluid flowing into the sensor channel S is regulated. Therefore, it is possible to obtain a very stable output. Further, the upstream temperature sensing resistor R1, the downstream temperature sensing resistor R2, the heating resistor Rt, and the fluid temperature sensing resistor Rt, are provided on the measurement chip 11, a control is made by the electric circuit so as to give a constant temperature difference between the heating resistor Rh and the fluid temperature sensing resistor Rt, and the flow rate of the fluid under measurement is measured based on a temperature difference between the upstream and downstream temperature sensing resistors R1, R2. Consequently, it is possible to detect the flow rate in either direction.

It goes without saying that the above embodiments are mere illustrative and do not restrict the present invention at all and that various improvements and modifications may be made within the scope not departing from the gist of the invention. For example, although three types of laminates are described in the above embodiments, no limitation is made thereto, but laminates may be constituted by combining the thin sheets 51, 52, 53, and 56, or the thin sheets 151 to 156.

According to the present invention, as set forth above, there is provided a thermal flowmeter having not only a sensor channel with flow rate measuring resistors mounted thereover bridgewise but also a bypass channel relative to the sensor channel, wherein the bypass channel is formed by bringing a substrate with electrodes formed on a surface thereof for connection to an electric circuit to carry out a measurement principle using resistors into close contact with a body formed with a fluid channel having a side-face opening so as to close the side-face opening through a laminate formed by laminating plural thin sheets having been subjected to etching, the sensor channel is defined by a groove formed in at least one of a measurement chip and the substrate when electrodes for resistors and the electrodes for the electric circuit are bonded together to mount the measurement chip onto the substrate, the measurement chip having the resistors and the electrodes for resistors which electrodes are connected to the resistors, the resistors of the measurement chip comprising an upstream temperature sensing resistor disposed on an upstream side in a fluid flowing direction, a downstream temperature sensing resistor disposed on a downstream side in the fluid flowing direction, a heating resistor disposed between the upstream temperature sensing resistor and the downstream temperature sensing resistor to heat both resistors, and a fluid temperature sensing resistor for sensing the temperature of a fluid under measurement, the electric circuit making a control so that the heating resistor and the fluid temperature sensing resistor show a constant temperature difference, and the flow rate of the fluid under measurement is measured based on a temperature difference between the upstream temperature sensing resistor and the downstream temperature sensing resistor. According to this construction, not only the flow rate can be detected in either direction, but also a linear output characteristic can be obtained; besides, it is possible to obtain a stable output without impairing the response characteristic.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A thermal flowmeter having not only a sensor channel over which resistors for measuring a flow rate are mounted bridgewise but also a bypass channel relative to the sensor channel, the thermal flowmeter comprising:
    a body having a shape which is symmetric right and left;
    a laminate having a shape which is symmetric, the laminate being fitted in the body to divide a fluid into a fluid portion flowing into the sensor channel and a fluid portion flowing into the bypass channel;
    an upstream temperature sensing resistor disposed in the sensor channel on an upstream side in a fluid flowing direction;
    a downstream temperature sensing resistor disposed in the sensor channel on a downstream side in the fluid flowing direction;
    a heating resistor disposed between the upstream temperature sensing resistor and the downstream temperature sensing resistor to heat the upstream temperature sensing resistor and the downstream temperature sensing resistor;
    a fluid temperature sensing resistor for sensing the temperature of a fluid under measurement; and
    an electric circuit which makes a control so that the heating resistor and the fluid temperature sensing resistor show a constant difference in temperature and which measures the flow rate of the fluid under measurement based on a temperature difference between the upstream temperature sensing resistor and the downstream temperature sensing resistor.

2. A thermal flow meter according to claim 1, wherein a mesh sheet formed by a thin sheet and having mesh portions at both ends of the sheet is included in the laminate.

3. A thermal flowmeter according to claim 2, wherein the laminate is formed by laminating the plural number of the mesh sheet through a spacer formed by a thin sheet which has an opening formed in the other portion than an edge portion thereof.

4. A thermal flowmeter according to claim 2, wherein the laminate is formed by laminating the plural number of the mesh sheet through a grooved both-end opening sheet, the grooved both-end opening sheet being formed by a thin sheet having openings at both ends thereof and a central groove.

5. A thermal flowmeter according to claim 4, wherein the laminate includes a both-end opening sheet having openings at both ends thereof.

6. A thermal flowmeter having not only a sensor channel over which resistors for measuring a flow rate are mounted bridgewise but also a bypass channel relative to the sensor channel, wherein:
    the bypass channel is formed by bringing a substrate with electrodes formed on a surface thereof for connection to an electric circuit to carry out a measurement principle using resistors into close contact with a body formed with a fluid channel having a side-face opening so as to close the side-face opening through a laminate formed by laminating plural thin sheets having been subjected to micromachining;
    the sensor channel is defined by a groove formed in at least one of a measurement chip and the substrate when electrodes for resistors and the electrodes for the electric circuit are bonded together to mount the measurement chip onto the substrate, the measurement chip having the resistors and the electrodes for resistors which electrodes are connected to the resistors;

the resistors of the measurement chip comprising:

an upstream temperature sensing resistor disposed on an upstream side in a fluid flowing direction;

a downstream temperature sensing resistor disposed on a downstream side in the fluid flowing direction;

a heating resistor disposed between the upstream temperature sensing resistor and the downstream temperature sensing resistor to heat the upstream temperature sensing resistor and the downstream temperature sensing resistor; and a fluid temperature sensing resistor for sensing the temperature of a fluid under measurement;

the electric circuit making a control so that the heating resistor and the fluid temperature sensing resistor show a constant difference in temperature, and the flow rate of the fluid under measurement is measured based on a temperature difference between the upstream temperature sensing resistor and the downstream temperature sensing resistor.

7. A thermal flow meter according to claim 6, wherein a mesh sheet formed by a thin sheet and having mesh portions at both ends of the sheet is included in the laminate.

8. A thermal flowmeter according to claim 7, wherein the laminate is formed by laminating the plural number of the mesh sheet through a spacer formed by a thin sheet which has an opening formed in the other portion than an edge portion thereof.

9. A thermal flowmeter according to claim 7, wherein the laminate is formed by laminating the plural number of the mesh sheet through a grooved both-end opening sheet, the grooved both-end opening sheet being formed by a thin sheet having openings at both ends thereof and a central groove.

10. A thermal flowmeter according to claim 9, wherein the laminate includes a both-end opening sheet having openings at both ends thereof.

* * * * *